US010926869B2

(12) United States Patent
Huynh et al.

(10) Patent No.: US 10,926,869 B2
(45) Date of Patent: Feb. 23, 2021

(54) JAM MITIGATION IN AIRCRAFT FLY-BY-WIRE SYSTEMS AND RELATED METHODS

(71) Applicant: The Boeing Company, Chicago, IL (US)

(72) Inventors: Neal V. Huynh, Bellevue, WA (US); Joseph E. Elliott, Shoreline, WA (US)

(73) Assignee: The Boeing Company, Chicago, IL (US)

(*) Notice: Subject to any disclaimer, the term of this patent is extended or adjusted under 35 U.S.C. 154(b) by 58 days.

(21) Appl. No.: 16/204,476

(22) Filed: Nov. 29, 2018

(65) Prior Publication Data
US 2020/0172230 A1 Jun. 4, 2020

(51) Int. Cl.
B64C 19/00 (2006.01)
B64C 13/04 (2006.01)

(52) U.S. Cl.
CPC .......... B64C 19/00 (2013.01); B64C 13/044 (2018.01)

(58) Field of Classification Search
CPC ....... B64C 19/00; B64C 13/044; B64C 13/04; B64C 13/0421; B64C 13/503; B64C 13/507; G05D 1/0077; G05G 7/00; B64D 2045/001
See application file for complete search history.

(56) References Cited

U.S. PATENT DOCUMENTS 5,806,806 A 9/1998 Boehringer et al.
8,380,364 B2 2/2013 Ciholas et al.
8,712,606 B2 8/2014 Beaufrere
9,437,056 B2 9/2016 Huynh et al.
10,002,472 B2 6/2018 Huynh et al.
2005/0234607 A1* 10/2005 Cartmell ............... B64C 13/503
701/3
2014/0232568 A1 8/2014 Pennell et al.
2016/0104331 A1* 4/2016 Huynh ................. G07C 5/0808
701/4
2016/0214704 A1* 7/2016 Antraygue .......... G05D 1/0808
2017/0212514 A1* 7/2017 Taylor ................. G05D 1/0077

FOREIGN PATENT DOCUMENTS

EP 2311729 4/2011
WO 2015181525 12/2015
WO 2018156618 8/2018

OTHER PUBLICATIONS

European Patent Office, "Extended European Search Report", issued in connection with application No. 19205557.2 dated Jan. 13, 2020, 9 pages.

* cited by examiner

Primary Examiner — Anne Marie Antonucci
Assistant Examiner — Andrew J Cromer
(74) Attorney, Agent, or Firm — Hanley, Flight & Zimmerman, LLC

(57) ABSTRACT

Systems and methods for jam mitigation in aircraft fly-by-wire systems are described herein. An example method of controlling an aircraft with a fly-by-wire system includes determining a current position of a pilot cockpit controller of the fly-by-wire system, determining an amount of pilot input force applied to the pilot cockpit controller, determining an expected pilot input force value that corresponds to the current position of the pilot cockpit controller, and, if the amount of pilot input force applied exceeds the expected pilot input force value by a threshold, generating a pilot command based on the amount of pilot input force applied and not the current position of the pilot cockpit controller.

20 Claims, 15 Drawing Sheets

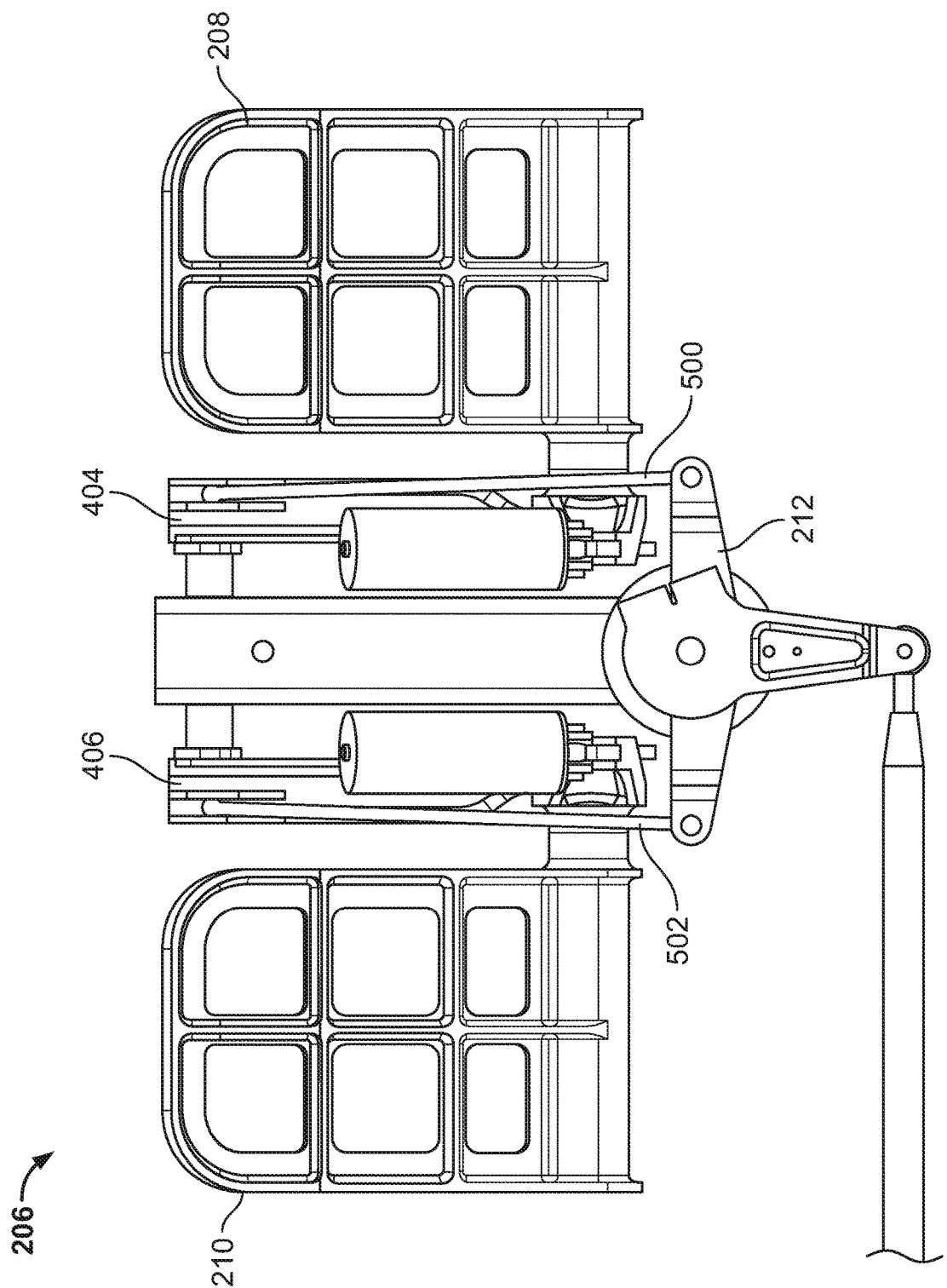

JAM MITIGATION IN AIRCRAFT FLY-BY-WIRE SYSTEMS AND RELATED METHODS

FIELD OF THE DISCLOSURE

This disclosure relates generally to aircraft and, more particularly, to jam mitigation in aircraft fly-by-wire systems and related methods.

BACKGROUND

Some aircraft employ fly-by-wire flight control systems to control one or more flight control surfaces of the aircraft. In a fly-by-wire flight control system, a pilot cockpit controller (e.g., a side stick, a control column, a control wheel, a set of rudder pedals, etc.) does not directly mechanically actuate the corresponding flight control surface(s). Instead, a position of the pilot cockpit controller is used by a fly-by-wire flight control computer to command an actuation system to move the flight control surface(s) to the corresponding position.

SUMMARY

Disclosed herein is an example method of controlling an aircraft with a fly-by-wire system. The example method includes method includes determining a current position of a pilot cockpit controller of the fly-by-wire system, determining an amount of pilot input force applied to the pilot cockpit controller, determining an expected pilot input force value that corresponds to the current position of the pilot cockpit controller, and, if the amount of pilot input force applied exceeds the expected pilot input force value by a threshold, generating a pilot command based on the amount of pilot input force applied and not the current position of the pilot cockpit controller.

Also disclosed herein is an example fly-by-wire system for an aircraft. The example fly-by-wire system includes a pilot cockpit controller, a position sensor to detect a position of the pilot cockpit controller, a force sensor to detect an amount of pilot input force applied to the pilot cockpit controller, and a flight control computer. The flight control computer is to determine an expected pilot input force value corresponding to the position of the pilot cockpit controller detected by the position sensor, determine whether a difference between the amount of pilot input force applied detected by the force sensor and the expected pilot input force value satisfies a threshold, and, if the difference satisfies the threshold, generate a pilot command based on the amount of pilot input force applied.

Also disclosed herein is a flight control computer including a logic circuit to at least determine pilot input force applied to a pilot cockpit controller of a fly-by-wire system of an aircraft, determine an expected pilot input force value that corresponds to a current position of the pilot cockpit controller, determine the pilot input force applied exceeds the expected pilot input force value by a threshold, and, in response to determining the pilot input force applied exceeds the expected pilot input force value by the threshold, determine a pilot command based on the pilot input force applied.

BRIEF DESCRIPTION OF THE DRAWINGS

FIG. 6 is a front view of the first set of rudder pedals and associated flight control components of FIGS. 4A and 4B.

The figures are not to scale. In general, the same reference numbers will be used throughout the drawing(s) and accompanying written description to refer to the same or like parts.

DETAILED DESCRIPTION

Figure 1:
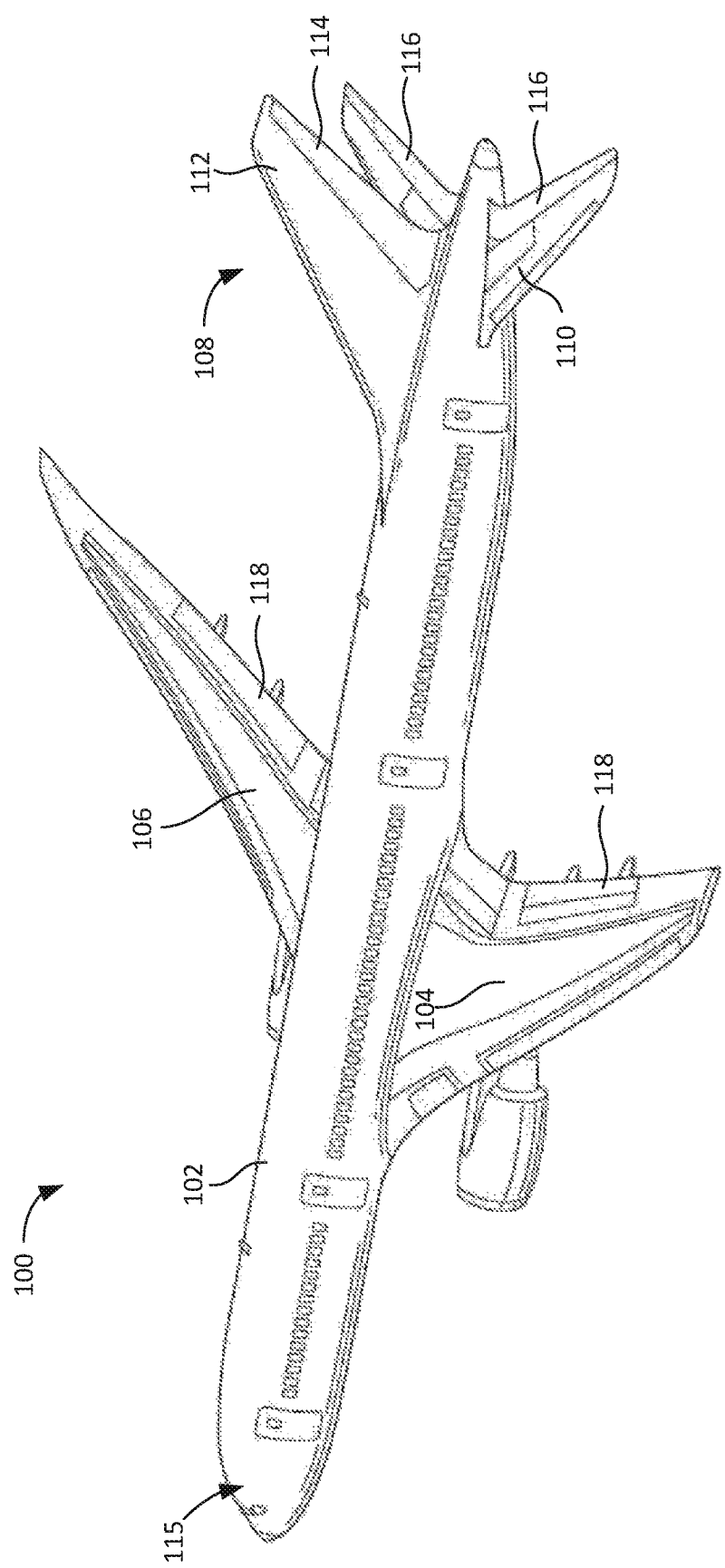
FIG. 1 illustrates an example aircraft in which examples disclosed herein may be implemented.

Disclosed herein are example aircraft fly-by-wire (FBW) flight control systems and related methods that may be employed to mitigate a jam in the FBW flight control system. Example systems and methods disclosed herein are less complex than known jam mitigation architectures, such as in U.S. Pat. No. 5,806,806. The architecture in U.S. Pat. No. 5,806,806, FIG. 1, employs an override device and associated flight control components to mitigate a jam in a rudder control system. When a jam occurs in one of the sets of rudder pedals, the other set of pedals may still be operational but requires a significantly higher (abnormal) pilot input force to be applied to the non-jammed rudder pedals. This higher pilot input force is required for the override device to disconnect the jammed rudder pedals from the non-jammed rudder pedals. Therefore, only one of the two pilots can control one set of rudder pedals while the other set is jammed.

Examples disclosed herein provide a simpler system architecture for the FBW flight control system to control a flight control surface based on a normal pilot input force applied to a cockpit controller (such as a set of rudder pedals). Therefore, examples disclosed herein reduce system cost, reduce system weight, and improve aircraft handling quality by not requiring a correct control transferring between the pilot and co-pilot, and not requiring the pilot or co-pilot to apply an abnormal pilot input force in the event of a jam.

FBW flight control systems typically include a pilot cockpit controller (sometimes referred to as an inceptor) and one or more associated flight control component(s) that are used for manual control of a flight control surface. For example, the pilot cockpit controller may be a set of rudder pedals and the corresponding flight control surface may be a rudder. The associated flight control component(s) may include the component(s) coupled to the pilot cockpit controller, such as a downstream shaft or rod, a bell crank, etc. As another example, the pilot cockpit controller may be a control column and the corresponding flight control surface may be one or more elevators. As yet another example, the pilot cockpit controller may be a control wheel and the corresponding flight control surface may be one or more ailerons and/or spoilers. FBW flight control systems may be provided to control one or more of these flight control surfaces.

In a FBW flight control system, the pilot cockpit controller and its associated flight control component are not directly mechanically coupled to the corresponding flight control surface. In other words, an input (e.g., force and/or movement) to a pilot cockpit controller and its associated flight control components utilizes other supporting systems to position the corresponding flight control surface. For example, the flight control surface is positioned by one or more actuation systems based on a position of the pilot cockpit controller, an autopilot system input, a FBW control law input, or one or more of the aforementioned. A set of rudder pedals is one type of pilot cockpit controller. If the rudder pedals are moved to a new position, for example, the FBW flight control computer processes the new position and generates a command for the actuation system to move the corresponding flight control surface, such as the rudder, to a new position.

However, if the pilot cockpit controller or its associated flight control component(s) becomes jammed and/or is otherwise not able to be moved, the corresponding control surface is also jammed because the position of the control surface primarily follows the position of the pilot cockpit controller. The aforementioned known system(s) cannot completely take over the command from the pilot cockpit controller. Therefore, if the rudder pedals, for instance, and/or the associated flight control component(s) become jammed, the pilot cannot move the rudder pedals and, thus, the rudder control is lost, which could affect the aircraft safety.

Disclosed herein are example FBW flight control systems and related methods that detect a system jam, mitigate a system jam, and improve aircraft handling qualities. An example FBW flight control system disclosed herein includes a FBW flight control computer that generates commands for a flight control surface, such as a rudder, based on a position of a corresponding pilot cockpit controller, such as a set of rudder pedals. To detect whether a jam has occurred (e.g., in the pilot cockpit controller and/or its associated flight control component(s)), the example FBW flight control computer receives signals from one or more force sensors coupled to the rudder pedals and/or the associated flight control component(s) (e.g., a bell crank, a shaft, etc.). The FBW flight control computer determines an amount of force applied by the pilot to the rudder pedals based on the signals from the force sensor(s). The FBW flight control computer also determines an expected pilot input force value corresponding to the current position of the set of rudder pedals (e.g., as detected by a position sensor). In some examples, the FBW flight control computer uses a look-up table of pilot input force values and corresponding positions of the rudder pedals exhibited during normal system operation. The FBW flight control computer compares the amount of pilot input force applied to the expected pilot input force value. If the difference between the amount of pilot input force applied and the expected pilot input force value does not exceed a threshold, it is indicative that that a jam has not occurred and the pilot cockpit controller is operating in a normal manner. However, if the difference exceeds a threshold, then it is indicative that a jam has occurred. In some examples, the threshold is at least 5 percent (%) of the expected pilot input force value. In other examples, other thresholds may be used.

If a jam is detected (e.g., based on the applied input force exceeding the threshold), the FBW flight control computer switches to a mode in which the FBW flight control computer uses the amount of pilot input force applied to the pilot cockpit controller and/or its associated flight control component to generate a pilot command for the corresponding flight control surface rather than the position of the pilot cockpit controller or its associated flight control component. For example, the FBW flight control computer determines an expected position of the rudder pedals based on the amount of pilot input force applied (e.g., using the look-up table). The FBW flight control computer then determines and generates a pilot command, such as a rudder pedal position input, based on the expected position. The rudder pedal position input represents a desired position or deflection of the rudder during normal (non-jammed) operation. The rudder is then positioned (e.g., via rudder actuation system) to the commanded position or deflection. In some examples, the FBW flight control computer includes a hysteresis band of pilot input force values and corresponding positions of the set of rudder pedals to determine the expected position of the rudder pedals. The hysteresis band accounts for the friction and dead-zone in the system when moving the rudder pedals away from a neutral position and toward the neutral position.

In some examples, the pilot command is input to flight control logic that slightly modifies (e.g., adds to or subtracts from) the pilot command based on inputs from one or more other sources (e.g., another flight control component, a sensor, etc.). The flight control logic generates a final command (indicative of a desired position or deflection) of the rudder, which is then input to an actuation system (e.g., an actuator controller) to activate an actuator to move the rudder to the corresponding position. As such, the example systems and methods disclosed herein enable a pilot to continue to control the aircraft (e.g., by moving the rudder) when one or both of the two redundant rudder pedal sets is jammed. Further, the examples disclosed herein enable a pilot and/or a co-pilot to continue to control the aircraft, unlike known systems where the flying pilot cannot control the aircraft because of the jam while the other pilot, after acceptance of control transfer, he/she then controls the rudder with a high rudder pedal input force and a reduced rudder system gain. While many of the examples disclosed herein are described in connection with a set of rudder pedals and a rudder, it is to be understood that the examples disclosed herein can likewise be used in connection with other types of pilot cockpit controllers and corresponding flight control surfaces (e.g., a control column that controls one or more elevators to pitch the aircraft, a control wheel and one or more ailerons to roll the aircraft, a side stick that controls the pitch and roll axis of the aircraft, etc.).

Now turning to the figures, FIG. 1 illustrates an example aircraft 100 in which examples disclosed herein may be implemented. In the illustrated example, the aircraft 100 includes a fuselage 102, a first wing 104 coupled to the fuselage 102, and a second wing 106 coupled to the fuselage 102. The example aircraft 100 also includes a tail section 108 with a horizontal stabilizer 110 and a vertical stabilizer 112.

The aircraft 100 may include one or more moveable flight control surfaces on various parts of aircraft 100 to control the attitude and flight path of the aircraft 100. For example, the vertical stabilizer 112 includes a moveable rudder 114. The rudder 114 is moveable to yaw the aircraft (i.e., steer the aircraft 100 left or around about a vertical Z axis). In some examples, the rudder 114 is controlled by one or more sets of rudder pedals in a cockpit 115 of the fuselage 102. A pilot may move the rudder pedals to control the direction of the rudder 114 and, thus, yaw the aircraft 100. As another example, the aircraft 100 includes elevators 116 that may be moved to pitch the aircraft (i.e., tilt the nose of the aircraft 100 up or down about a horizontal axis). In some examples, the elevators 116 are controlled by one or more control columns in the cockpit 115. As yet another example, the aircraft 100 includes ailerons 118 to roll the aircraft 100 (e.g., about a longitudinal axis of the aircraft 100). In some examples, the ailerons 118 are controlled by the control column(s) and/or one or more control wheels in the cockpit 115.

In traditional aircraft, these moveable flight control surfaces are moved or operated by a direct mechanical connection to the corresponding pilot cockpit controller (and the associated flight control components) in the cockpit 115. In recent years, many aircraft have been outfitted with FBW flight control systems. In a FBW flight control system, the flight control surface is moved by an actuation system (e.g., including one or more actuators) based on a pilot command from the FBW flight control computer. Some aircraft utilize FBW flight control systems for controlling all of the flight control surfaces, while other aircraft utilize FBW flight control systems for controlling only certain ones of the flight control surfaces.

Figure 2:
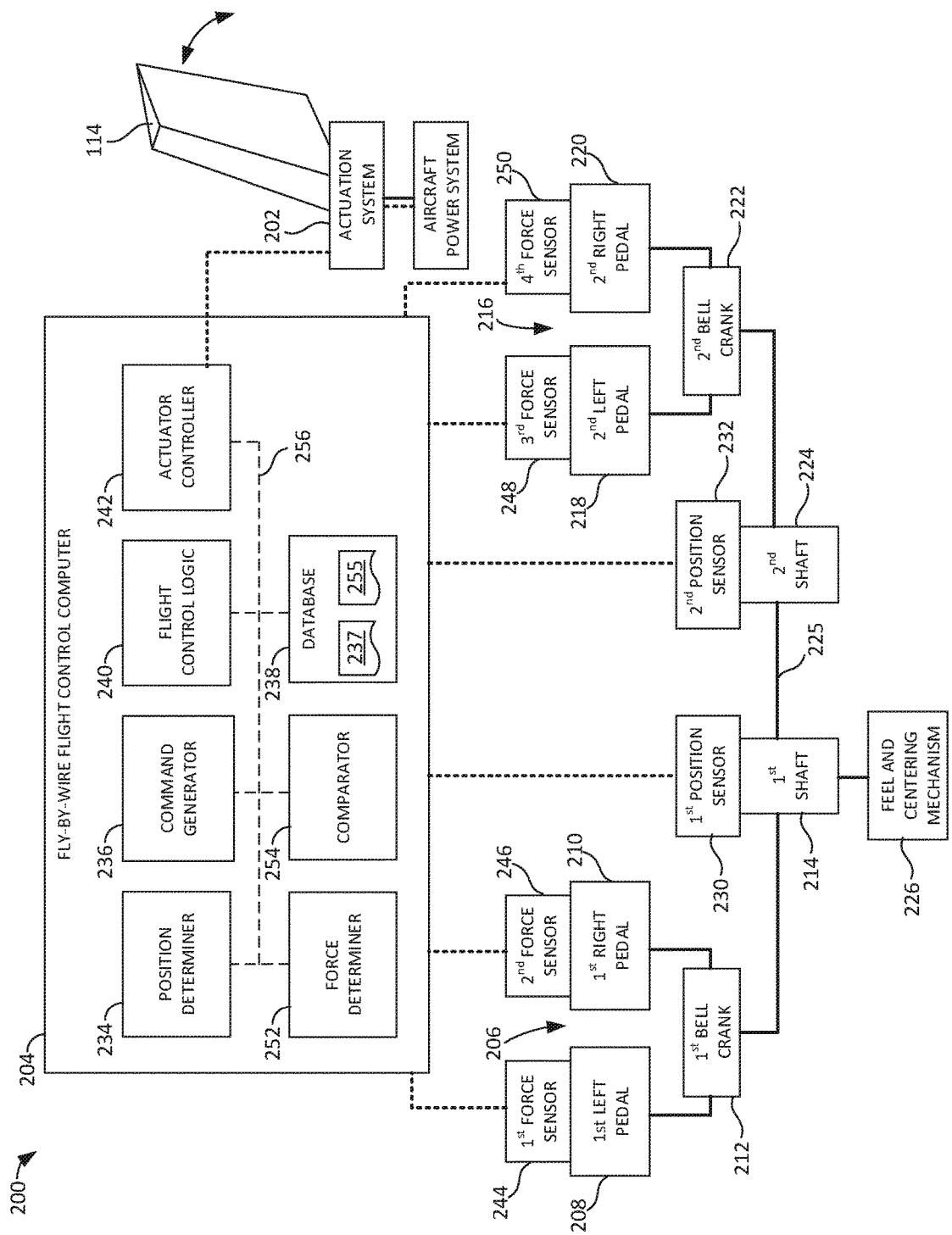
FIG. 2 is a schematic illustration of an example fly-by-wire (FBW) flight control system including an example FBW flight control computer constructed in accordance with the teachings of this disclosure.

FIG. 2 is a schematic illustration of an example FBW flight control system 200 (referred to herein as the FBW system 200) that may be used to control one or more flight control surfaces. In this example, the FBW system 200 includes a rudder control system that is used to control the rudder 114. The FBW system 200 includes an actuation system 202 operatively coupled to the rudder 114. The actuation system 202 in this example includes one or more (redundant) rudder actuators (e.g., linear actuators, rotary actuators, etc.) that are powered by aircraft power system(s) (e.g., by hydraulic power or by electrical power or by hybrid power) and Remote Electronic Units. The actuation system 202 operates to move the rudder 114 based on a command from a FBW flight control computer 204 (which may be referred to as a flight control computer or flight control electronics (FCE)) of the FBW system 200, as disclosed in further detail herein. In FIG. 2, a solid line indicates a mechanical connection between two components whereas a dotted or dashed line indicates an electrical and/or data bus connection between two components.

The FBW flight control computer 204 controls the rudder 114 (the flight control surface) based on a position of a pilot cockpit controller. In this example, the pilot cockpit controller is implemented as one or more sets of rudder pedals. For example, as shown in FIG. 2, the FBW system 200 includes a first set of rudder pedals 206 including a first left pedal 208 and a first right pedal 210 that are moveable by a pilot (sometimes referred to as a captain) of the aircraft 100 (FIG. 1). In particular, the first set of rudder pedals 206 is disposed in the cockpit 115 (FIG. 1) of the aircraft 100 and positioned in front of a pilot's chair. The first left and right pedals 208, 210 are mechanically coupled such that movement of one pedal moves the other pedal in the opposite direction. For example, if the pilot pushes (with his/her right foot) the first right pedal 210 forward (away from the pilot), the first left pedal 208 is moved rearward (toward the pilot), and vice versa.

In the illustrated example, the first left and right pedals 208, 210 are coupled via a first bell crank 212. The first bell crank 212 is coupled to a first shaft 214. Movement of the first left and right pedals 208, 210 pivots or rotates the first bell crank 212, which causes the first shaft 214 to rotate. In other examples, the first left and right pedals 208, 210 can be coupled via one or more other structure(s).

In some examples, a second set of rudder pedals is provided for a co-pilot (sometimes referred to as a first officer). In the illustrated example, the FBW system 200 includes a second set of rudder pedals 216 including a second left pedal 218 and a second right pedal 220 that are movable by the co-pilot. Similar to the first left and right pedals 208, 210, the second left and right pedals are 218, 220 are mechanically coupled to each other via a second bell crank 222, which is coupled to a second shaft 224. The first and second shafts 214, 224 are mechanically coupled (e.g., via a push rod or control rod), such that movement of one of the shafts moves the other shaft. Therefore, the first and second sets of rudder pedals 206, 216 move in unison. For example, if the pilot pushes on the first left pedal 208, the second left pedal 218 is also moved in the same direction and the same distance, and vice versa. In some examples, the first and second shafts 214, 224 are coupled via a push rod 225. The push rod 225 rigidly couples the first and second shafts 214, 224. Therefore, rotation of one of the first or second shafts 214, 224 rotates the other one of the first or second shafts 214, 224. In known architectures, a force limiting rod or spring-loaded force limiter is coupled between the first and second shafts 214, 224 (e.g., in place of the push rod 225). Such a device rigidly couples the first and second shafts 214, 224 during normal operation. If a jam occurs at either the first or the second sets of rudder pedals 206, 216, a high pilot input force applied on the non-jam set uncouples the first and second shafts 214, 224. In such an example, the input from the non-jam set of rudder pedals controls the rudder 114 with a reduced system gain (e.g., only one of two sets of position sensors is processed by the FBW flight control computer 204, so to achieve the same rudder travel, the rudder pedal input is doubled). The example systems and methods disclosed herein can also be used in connection with known pilot-initiated-disconnect architectures (e.g., utilizing handle release). Therefore, in some examples, the example systems and methods can be implemented in connection with a design or architecture that does not employ known jam mitigation devices or architectures. In other examples, the example systems and methods disclosed herein may be implemented in connection with known jam mitigation architectures. Thus, the examples disclosed herein can be used to improve upon known architectures. While in the illustrated example of FIG. 2 two sets of rudder pedals are provided, in some examples, the FBW system 200 may only include one set of rudder pedals for one pilot.

In some examples, a feel system is included for aircraft with powered actuation of a flight control surface. In some examples, a non-uniform feel force is implemented to provide a pilot an awareness of magnitude of rudder control input and facilitate returning the first and second sets of rudder pedals 206, 216 to the neutral position when the first and second sets of rudder pedals 206, 216 are released. The example FBW system 200 of FIG. 2 uses a feel and centering mechanism 226 for the feel system. In the illustrated example, the feel and centering mechanism 226 is coupled to the first shaft 214. In other examples, the feel and centering mechanism 226 may be coupled to another structure (e.g., the second shaft 224). The feel and centering mechanism 226 provides a feel force and centers the first and second sets of rudder pedals 206, 216 to their neutral position. For example, when the first shaft 214 is moved away from the neutral position (e.g., as caused by the pilot and/or co-pilot pushing one of the pedals), the feel and centering mechanism 226 provides a feel force for the flying pilot(s). The force created by the feel and centering mechanism 226 increases (e.g., linearly or non-linearly) as the flying pilot pushes his/her rudder pedal away from their neutral position(s). When the flying pilot relaxes his/her applied force or removes his/her foot, the feel and centering mechanism 226 provides an aiding force for returning the first set of rudder pedals 206 (and, thus, the second set of rudder pedals 216) back to their neutral position (e.g., which may correspond to a 0° deflection of the rudder 114). The rudder pedal feel force is typically designed with consideration of human strength standards for aviation candidates, with combined operating foot and hand controls, and with aircraft and pilot closed-loop performance requirements.

As disclosed above, the FBW flight control computer 204 can control the rudder 114 based on the position of the first and/or second sets of rudder pedals 206, 216. To determine the position of the first and/or second sets of rudder pedals 206, 216, the example FBW system 200 includes one or more position sensors. For example, as shown in FIG. 2, the FBW system 200 includes a first position sensor 230. In the illustrated example, the first position sensor 230 detects a position of the first shaft 214. The position of the first shaft 214 corresponds to the position of the first left and/or right pedals 208, 210. The first position sensor 230 is communicatively coupled to the FBW flight control computer 204 and outputs signals (indicative of the detected position of the first shaft 214) to the FBW flight control computer 204, which determines the position of the first set of rudder pedals 206. In some examples, movement of the first left pedal 208 forward (away from the pilot) is given a positive position value while movement of the first right pedal 210 forward (away from the pilot) is given a negative position value. For example, a position of +2 inches indicates the first left pedal 208 has been moved forward 2 inches and the first right pedal 210 has been moved rearward 2 inches, whereas a position of −2 inches indicates the first right pedal 210 has been moved forward 2 inches and the first left pedal 208 has been moved rearward 2 inches. While in the illustrated example one position sensor is utilized to detect the position of the first shaft 214, in other examples, multiple position sensors are provided for redundancy. Further, while in the illustrated example the first position sensor 230 detects a position of the first shaft 214 (which corresponds to the position of the first set of rudder pedals 206), in other examples, the first position sensor 230 may detect a position of the first left pedal 208 and/or first right pedal 210 directly and/or another flight control component associated with the first set of rudder pedals 206 (e.g., the first bell crank 212). The first position sensor 230 may be, for example, a rotary variable differential transformer (RVDT), a linear variable differential transformer (LVDT), a potentiometer, or a resolver. In other examples, one or more other types of position sensors may be employed.

In some examples, the FBW system 200 includes a second position sensor 232 that detects a position of the second shaft 224, which can be used to determine the position of the second set of rudder pedals 216. The second position sensor 232 may be, for example, an RVDT, an LVDT, a potentiometer, or a resolver, for example. In other examples, the second position sensor 232 may be another type of position sensor. The second position sensor 232 is communicatively coupled to the FBW flight control computer 204 and outputs signals (indicative of the detected position of the second shaft 224) to the FBW flight control computer 204. If the first and second sets of rudder pedals 206, 216 are operating in a normal condition, the first and second position sensors 230, 232 generally detect the same position. Therefore, the second position sensor 232 may be provided for redundancy and safety. However, in other examples (such as where no second set of rudder pedals is provided), a second position sensor may not be provided.

In the illustrated example, the FBW flight control computer 204 includes a position determiner 234 that determines the position of the first set of rudder pedals 206 based on the signal(s) output by the first position sensor 230. Likewise, the position determiner 234 can determine the position of the second set of rudder pedals 216 based on the signal(s) output by the second position sensor 232.

The FBW flight control computer 204 includes a command generator 236 that generates one or more pilot commands based on the determined position(s) of the first and/or second sets of rudder pedals 206, 216. In particular, the command generator 236 determines the corresponding position to which the rudder 114 should be moved based on the determined position(s) of the first and/or second sets of rudder pedals 206, 216. For example, a position of +2 inches (meaning the first left pedal 208 is moved forward (away from the pilot) 2 inches and the first right pedal 210 is moved rearward 2 inches), may correspond to a deflection of 15° of the rudder 114 in one direction. On the other hand, a position of −2 inches (meaning the first right pedal 210 is moved forward (away from the pilot) 2 inches and the first left pedal 208 is moved rearward 2 inches), may correspond to a deflection of 15° of the rudder 114 in the opposite direction. Thus, different positions of the first set of rudder pedals 206 correspond to different positions or deflections of the rudder 114. In some examples, the command generator 236 refers to a look-up table 237 stored in a database 238. The look-up table 237 includes pedal positions and corresponding rudder positions/deflections. The pilot command is received by an actuator controller 242, which activates the actuation system 202 based on the desired position/deflection.

In some examples, the pilot command (representing the desired position or deflection of the rudder 114) is transmitted to flight control logic 240. The flight control logic 240 may modify (e.g., add to or subtract from) the pilot command based on one or more other commands (e.g., from other flight control systems, based on other sensor inputs, etc.) to generate a final command. While in the illustrated example the flight control logic 240 and the actuator controller 242 are shown as part of the FBW flight control computer 204, in other examples, the flight control logic 240 and/or the actuator controller 242 may be separate systems/ devices apart from the FBW flight control computer 204. In other examples, flight control logic may not be provided. Instead, in such examples, the pilot command is transmitted directly from the command generator 236 to the actuator controller 242 to control the position of the rudder 114.

If a jam occurs in one or both of the first or second sets of rudder pedals 206, 216 (and/or one of the associated structures (e.g., the first bell crank 212, the second bell crank 222, etc.)), the corresponding pilot cannot move the rudder pedals. The example FBW flight control computer 204 includes logic to detect whether a jam has occurred and mitigate such a jam. This enables the corresponding pilot to be able to continue to control the rudder 114.

To accomplish the above description, the FBW flight control computer 204 analyzes an amount of force applied to the first and/or second set of rudder pedals 206, 216. In particular, there is an expected amount of force for each position of the first and/or second sets of rudder pedals 206, 216. For example, 18 pounds (lbs) of force is required to move the right pedal off of its neutral position, 36 lbs of force is required to move the right pedal 1 inch forward, 45 lbs of force is required to move the right pedal 1.5 inches forward, etc. This correlation is generated by the force from the feel and centering mechanism 226 (and, in some examples, friction).

In the illustrated example, the FBW system 200 includes a first force sensor 244 that is associated with the first left pedal 208 and a second force sensor 246 that is associated with the first right pedal 210. In some examples, the first and second force sensors 244, 246 are coupled to the respective first left and right pedals 208, 210. In other examples, the first and/or second force sensors 244, 246 can be coupled to one or more of the associated flight control components. The first force sensor 244 detects a force applied to the first left pedal 208 (by the pilot's left foot) and the second force sensor 246 detects a force applied to the first right pedal 210 (by the pilot's right foot). The first and second force sensors 244, 246 are communicatively coupled to the FBW flight control computer 204 and output signals (indicative of the detected forces) to the FBW flight control computer 204. The first and/or second force sensors 244, 246 may be, for example, a variable differential transformer or a strain gauge. In other examples, other types of force sensors may be implemented. While in the illustrated example one force sensor is associated with each of the first left and right pedals 208, 210, in other examples, multiple force sensors may be coupled to one or both of the first left and right pedals 208, 210 for redundancy.

Similarly, if the second set of rudder pedals 216 is employed, a third force sensor 248 can be similarly associated with (e.g., coupled directly or directly to) the second left pedal 218 and a fourth force sensor 250 can be similarly associated with (e.g., coupled directly or indirectly to) the second right pedal 220. The third and fourth force sensors 248, 250 detect forces applied to the second left and right pedals 218, 220, respectively, and output signals to the FBW flight control computer 204. For sake of simplicity, the example operations disclosed below are described only in connection the first set of rudder pedals 206. However, it is to be understood that any of the example operations disclosed herein in connection with the first set of rudder pedals 206 can likewise be applied to the second set of rudder pedals 216.

In the illustrated example of FIG. 2, the FBW flight control computer 204 includes a force determiner 252. The flight control computer 204 may comprise a processor and instructions associated with the force determiner 252 (as in FIG. 12, for example), which when executed by the processor, cause the processor to at least determine an amount of pilot input force applied to the first left and/or right pedals 208, 210 based on the signals received from the force sensors 244, 246. The force determiner 252 receives the signals (force values) from the first and second force sensors 244, 246 and determines an amount of pilot input force applied to the first left and/or right pedals 208, 210, respectively, based on the signals. In some examples, the amount of pilot input force applied is calculated as a net force applied to the first left and right pedals 208, 210. For instance, force applied to the first left pedal 208 may be considered a positive force value while force applied to the first right pedal 210 may be considered a negative force value. As an example, a force of 40 lbs applied to the first left pedal 208 and a force of 10 lbs applied to the first right pedal 210 results in a net force of +30 lbs. Similarly, a force of 30 lbs applied to the first left pedal 208 and a force of 0 lbs applied to the first right pedal 210 would also result in +30 lbs of pilot input force applied.

The FBW flight control computer 204 includes a comparator 254 that compares the amount of pilot input force applied to the first set of rudder pedals 206 to an expected pilot input force value corresponding to the current position of the first set of rudder pedals 206. The flight control computer 204 may comprise a processor and instructions associated with the comparator 254, which when executed by the processor, causes the processor to at least compare the amount of pilot input force applied to the first set of rudder pedals 206 to an expected pilot input force value corresponding to the current position of the first set of rudder pedals 206 as they are moved and/or displaced by the pilot. In particular, a correlation exists between the amount of pilot input force expected and the corresponding positions of the first set of rudder pedals 206 (e.g., −2 inch position requires −50 lbs, −1 inch position requires −25 lbs, +1 inch position requires +25 lbs, +2 inch position requires +50 lbs, etc.). The comparator 254 determines an expected pilot input force based on the current pedal position (determined by the position determiner 234). In some examples, the comparator 254 uses a look-up table 255 stored in the database 238. The look-up table 255 includes correlations between pilot input force values and corresponding pedal positions that are typically experienced during normal operation.

After the comparator 254 determines the expected pilot input force value for the current position of the first set of rudder pedals 206, the comparator 254 compares the values to determine if the amount of pilot input force applied to the first set of rudder pedals 206 exceeds the expected pilot input force value by a threshold. In some examples, the threshold is a percentage of the expected force value, such as at least 5% of the expected force value. As an example, assume the first set of rudder pedals 206 is at a position +1.2 inches (as determined by the position determiner 234), and the expected pilot input force at this position is +30 lbs (e.g., according to the look-up table 255). Also assume the amount of pilot input force (as determined by the force determiner 252) is 38 lbs. Finally, assume the comparator 254 uses a threshold of 5% (meaning the threshold is 5% of the expected force of +32 lbs, which is +1.6 lbs). Therefore, in this example, the amount of pilot input force applied (+38 lbs) exceeds the expected pilot input force value (+32 lbs) by the threshold (5% or +1.6 lbs). Thus, in this instance, the comparator 254 determines the amount of pilot input force applied exceeds the expected force value by the threshold, which is indicative of a jam. However, if the amount of pilot input force applied was +33 lbs, for example, the comparator 254 would determine the amount of pilot input force applied does not exceed the expected pilot input force value by the threshold (because 33 lbs is less than 33.6 lbs) and, thus, is not indicative of a jam. If no jam is detected, the command generator 236 may continue to use the current position of the first set of rudder pedals 206 to generate pilot commands.

In other examples, the comparator 254 may detect a jam by determining whether a difference between the amount of pilot input force and the expected pilot input force satisfies (e.g., exceeds) a threshold. For instance, using the example above, the difference between the amount of pilot input force applied (38 lbs) and the expected pilot input force value (32 lbs) is 6 lbs. The comparator 254 may compare this value to a threshold (e.g., 5% of the expected pilot input force value). If the value satisfies the threshold (e.g., exceeds the threshold), the command generator 236 generates a pilot command for the flight control logic 240 based on the amount of pilot input force.

In other examples, other thresholds may be used. For example, the threshold may be at least 2% of the expected pilot input force value. In other examples, the threshold may be any threshold within a range, such as between 5% and 10% of the expected pilot input force value. In other examples, other ranges may be used, such as between 2% and 7% of the expected pilot input force value or between 3% and 5% of the expected pilot input force value. In other examples, the threshold may a predetermined force value rather than a percentage. For example, the threshold may be 5 lbs, 10 lbs, etc. In some such examples, the threshold force value may be based on the expected pilot input force value.

When the amount of pilot input force applied exceeds the expected pilot input force value by the threshold, it is indicative of a jam. To mitigate the jam and enable the pilot(s) to continue to control the rudder 114, the command generator 236 switches modes in the manner in which the pilot commands are generated. Instead of generating pilot commands based on the detected (current) position of the first set of rudder pedals 206 (e.g., a first mode), the command generator 236 generates pilot commands based on the amount of pilot input force applied to the first set of rudder pedals 206 (e.g., a second mode) and not the current position of the first set of rudder pedals 206.

For example, the command generator 236 may determine, based on the amount of pilot input force applied, an expected position of the first set of rudder pedals 206 (i.e., the position in which the first set of rudder pedals 206 would be in during normal operation when subjected to the amount of pilot input force). In some examples, the command generator 236 may consult the look-up table 255 stored in the database 238, which includes pilot input force values and the corresponding pedal positions. Then, based on the expected pedal position, the command generator 236 determines the appropriate pilot command (e.g., using the look-up table 237) and transmits the pilot command to the flight control logic 240. As disclosed above, the flight control logic 240 may adjust the commanded position/deflection based on other inputs. The final command is transmitted to the actuator controller 242, which activates the actuation system 202 to move the rudder 114 to the command position/deflection. As such, if the amount of pilot input force applied exceeds the expected pilot input force value by the threshold, the command generator 236 generates a pilot command for the flight control logic 240 based on the amount of pilot input force applied and not the determined position of the first set of rudder pedals 206. The position determiner 234, the command generator 236, the flight control logic 240, the actuator controller 242, the force determiner 252, and/or the comparator 254 may be communicatively coupled by a bus 256. The position determiner 234, the command generator 236, the flight control logic 240, the actuator controller 242, the force determiner 252, and/or the comparator 254 may be implemented by one or more logic circuits, including, for example, one or more analog or digital circuit(s), programmable processor(s) (e.g., the processor 1312 disclosed in connection with the processor platform 1300 of FIG. 13 below), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

Figure 3:
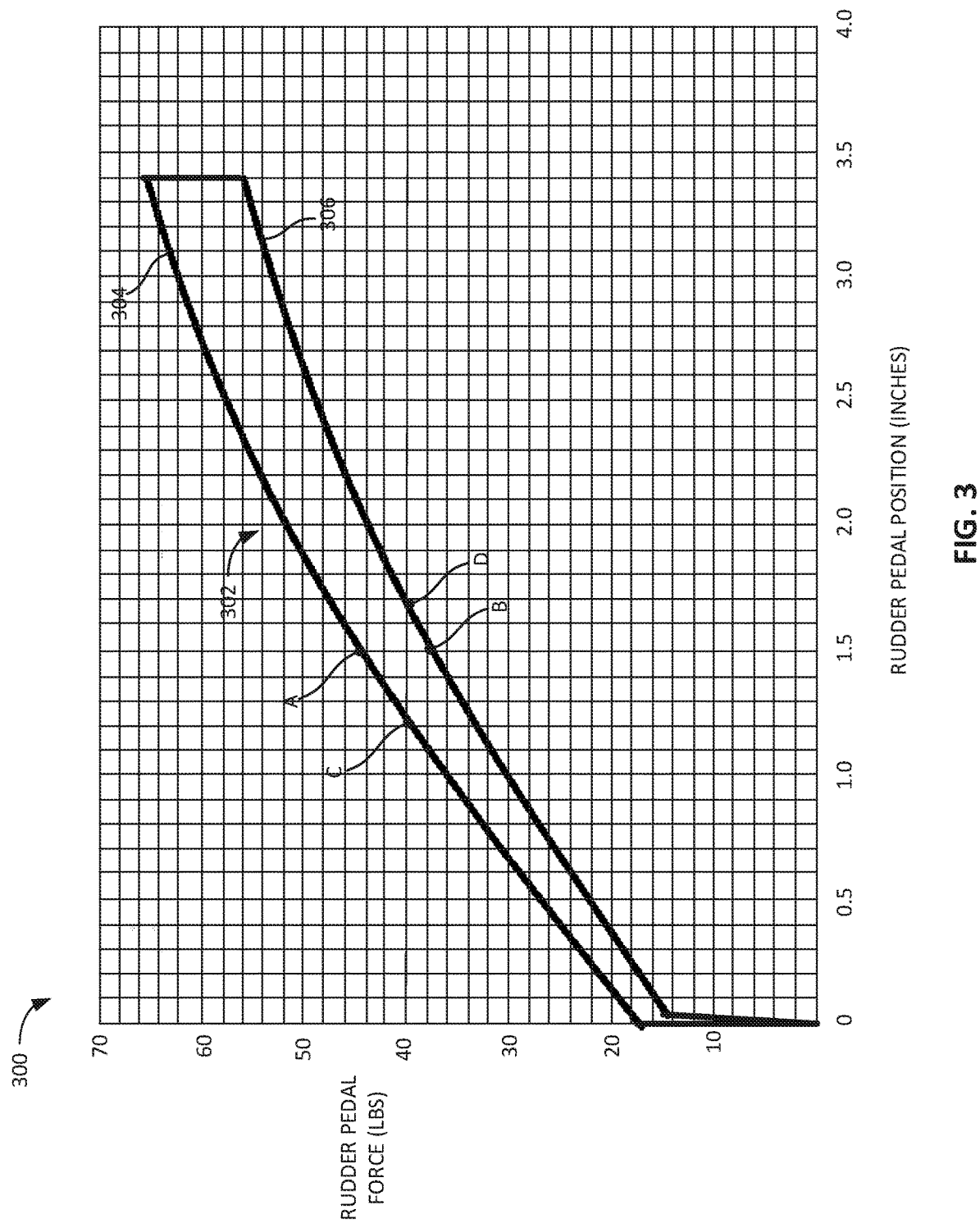
FIG. 3 is an example graph showing an example pilot input force at a rudder pedal versus rudder pedal position that includes a hysteresis band that may be used by the example FBW flight control computer of FIG. 2.

In some examples, the command generator 236 determines the expected position of the first set of rudder pedals 206 (and, thus, the target position/deflection of the rudder 114) using a hysteresis band that accounts for the difference in force and position correlation that occurs during normal operation of the first set of rudder pedals 206. For example, FIG. 3 is an example graph 300 showing the correlation between the expected pilot input force values and corresponding pedal positions of the first set of rudder pedals 206. The X axis represents pedal position (in inches) and the Y axis represents the pilot input force value (in pounds (lbs)). In the illustrated example, the X axis ranges from 0 inches to +4 inches, and the Y axis ranges from 0 lbs to +70 lbs. Thus, the graph 300 represents positions where the first left pedal 208 is pushed forward (away from the pilot) and a net positive force exists. A similar graph can also be provided for negative pedal positions and negative force values (i.e., where the first right pedal 210 is pushed away from the pilot) in the opposite direction.

An example hysteresis band 302 is plotted in the graph 300. The hysteresis band 302 represents the correlation between pedal position and the corresponding pilot input force applied during normal operation from either of the first or second sets of rudder pedals 206, 216. The hysteresis band 302 includes an upper line 304 and a lower line 306. The upper line 304 represents forces that are typically required and felt when moving the rudder pedal away from the neutral position, whereas the lower line 306 represents forces that are typically required and felt when moving the rudder pedal toward the neutral position. This hysteresis effect is caused by friction. For example, when moving the first set of rudder pedals 206 away from the neutral position (e.g., pushing the first left pedal 208 away from the pilot), the pilot applies a force that overcomes a counter force from the feel and centering mechanism 226 and a counter force from friction working against the movement of the first set of rudder pedals 206 and/or the associated flight control components (e.g., the first bell crank 212, the first shaft 214, etc.). However, when moving or allowing the first set of rudder pedals 206 to be moved back to the neutral position, the frictional force is working in the opposite direction of the feel and centering mechanism 226 (which is biasing the first set of rudder pedals 206 back to the neutral position). Therefore, less pilot input force is needed to hold or move the first set of rudder pedals 206 at the same positions. Thus, depending on whether the pilot is moving the first set of rudder pedals 206 away from or toward the neutral position, a different amount of pilot input force is required for the same relative position of the first set of rudder pedals 206.

For example, assume the first set of rudder pedals 206 is at a position of +1.5 inches (meaning the first left pedal 208 is moved forward 1.5 inches and the first right pedal 210 is moved rearward 1.5 inches). If the pilot is moving the first set of rudder pedals 206 away from the neutral position, the upper line 304 of the hysteresis band represents the required input force that is needed and/or felt by the pilot to move the first set of rudder pedals 206. As shown at point A on the upper line 304, the pilot applies and/or feels about +45 lbs of force in this position. However, if the pilot is moving the first set of rudder pedals 206 (or allowing the first set of rudder pedals 206 to be moved) toward the neutral position, the lower line 306 of the hysteresis band 302 represents the required input force that is needed and/or felt by the pilot. As shown at point B on the lower line 306, the pilot applies and/or feels about +38 lbs of force. Pilots are often familiar with this difference in force and, thus, have certain expectations of this hysteresis effect when operating the pedals.

In some examples, the command generator 236 uses the hysteresis band 302 to determine the expected position of the first set of rudder pedals 206 based on the determined pilot input force applied to more accurately capture the pilot's intent. The command generator 236 determines whether to use the upper line 304 or the lower line 306 based on the change in the pilot input force applied (e.g., by considering the sign of the derivative of a force curve). For example, if the amount of pilot input force applied (as determined by the force determiner 252) is increasing, the command generator 236 uses the upper line 304 to determine the expected pedal position, whereas if the pilot input force is decreasing, the command generator 236 uses the lower line 306 to determine the expected pedal position. For example, if the pilot input force (as determined by the force determiner 252) is +40 lbs and is generally increasing (i.e., the pilot is moving the first set of rudder pedals 206 away from the neutral position), the command generator 236 uses the upper line 304 and determines the expected pedal position to be about +1.2 inches, as indicated at point C. Then, based on this expected pedal position of +1.2 inches, the command generator 236 generates a corresponding pilot command for the rudder 114 that is transmitted to the flight control logic 240. However, if the amount of pilot input force applied (as determined by the force determiner 252) is +40 lbs and is generally decreasing (i.e., the pilot is moving the first set of rudder pedals 206 toward from the neutral position), the command generator 236 uses the lower line 306 and determines the expected pedal position to be about +1.7 inches, as indicated at point D. Then, based on this expected pedal position of +1.7 inches, the command generator 236 generates a corresponding pilot command for the rudder 114 that is transmitted to the flight control logic 240. Thus, in some examples, using the hysteresis band 302 creates a more accurate representation of the pilot's intent. The hysteresis band 302 (e.g., the data values) may be included in the look-up table 255, and the command generator 236 may use the data values when determining the expected pedal position for a pilot input force. In other examples, the hysteresis band 302 may not be used. Instead, a symmetric correlation of data points may be used for increasing forces and decreasing forces.

Figure 4A:
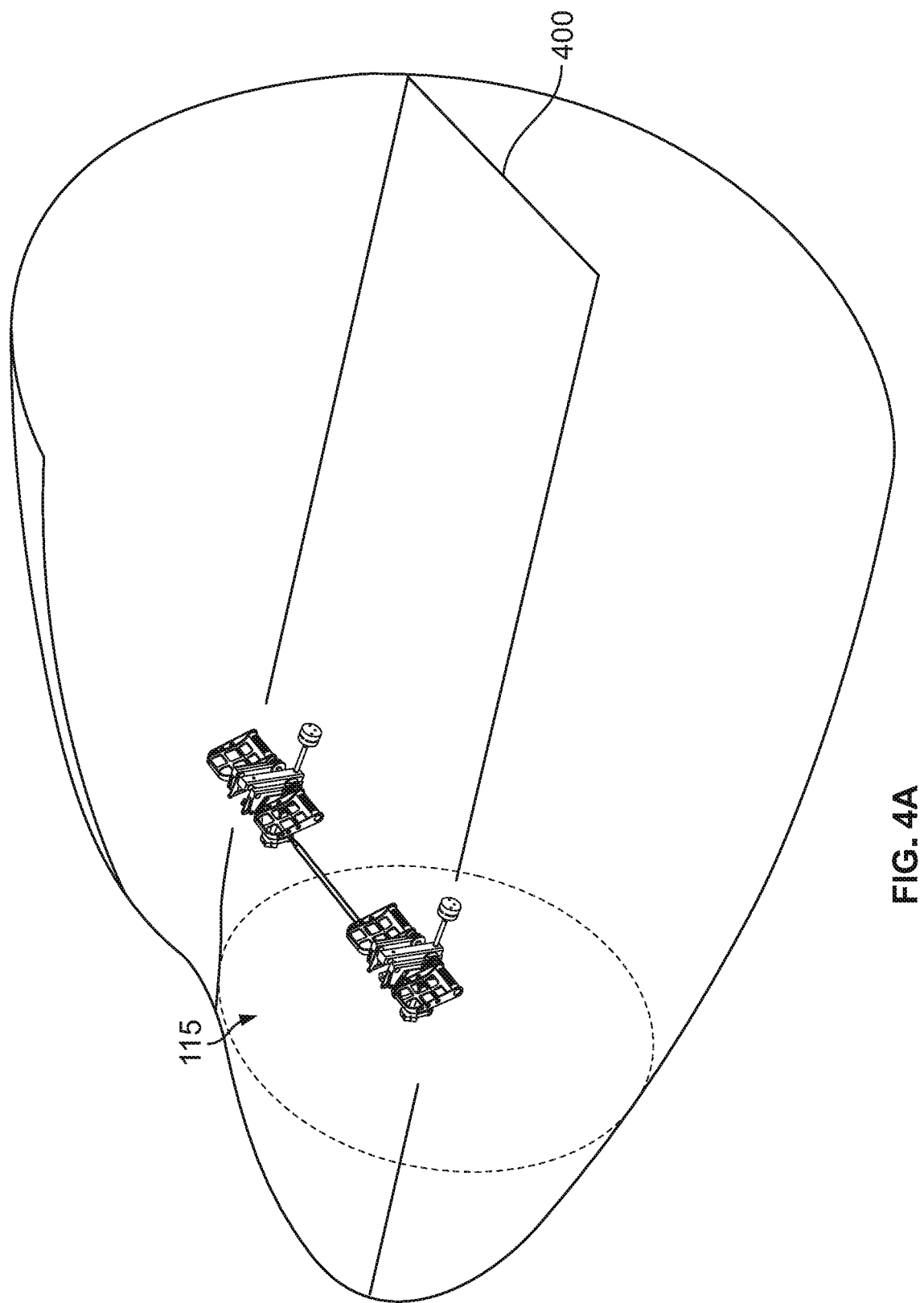
FIG. 4A is a left perspective view of example first and second sets of rudder pedals (pilot cockpit controllers) and associated flight control components that may be implemented in connection with the FBW flight control system of FIG. 2.
Figure 4B:
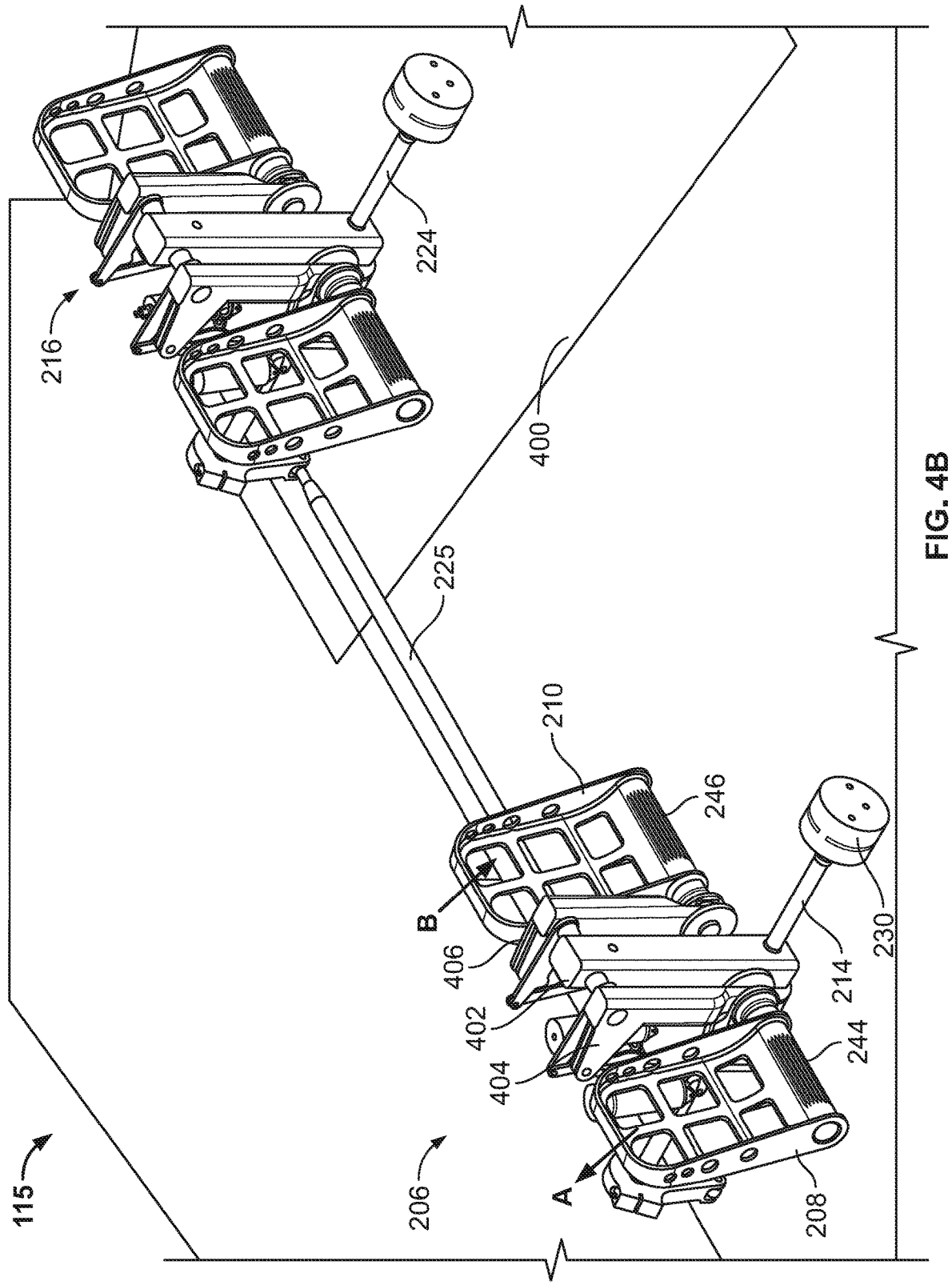
FIG. 4B is an enlarged view of the example first and second sets of rudder pedals and associated flight control components from FIG. 4A.
Figure 5A:
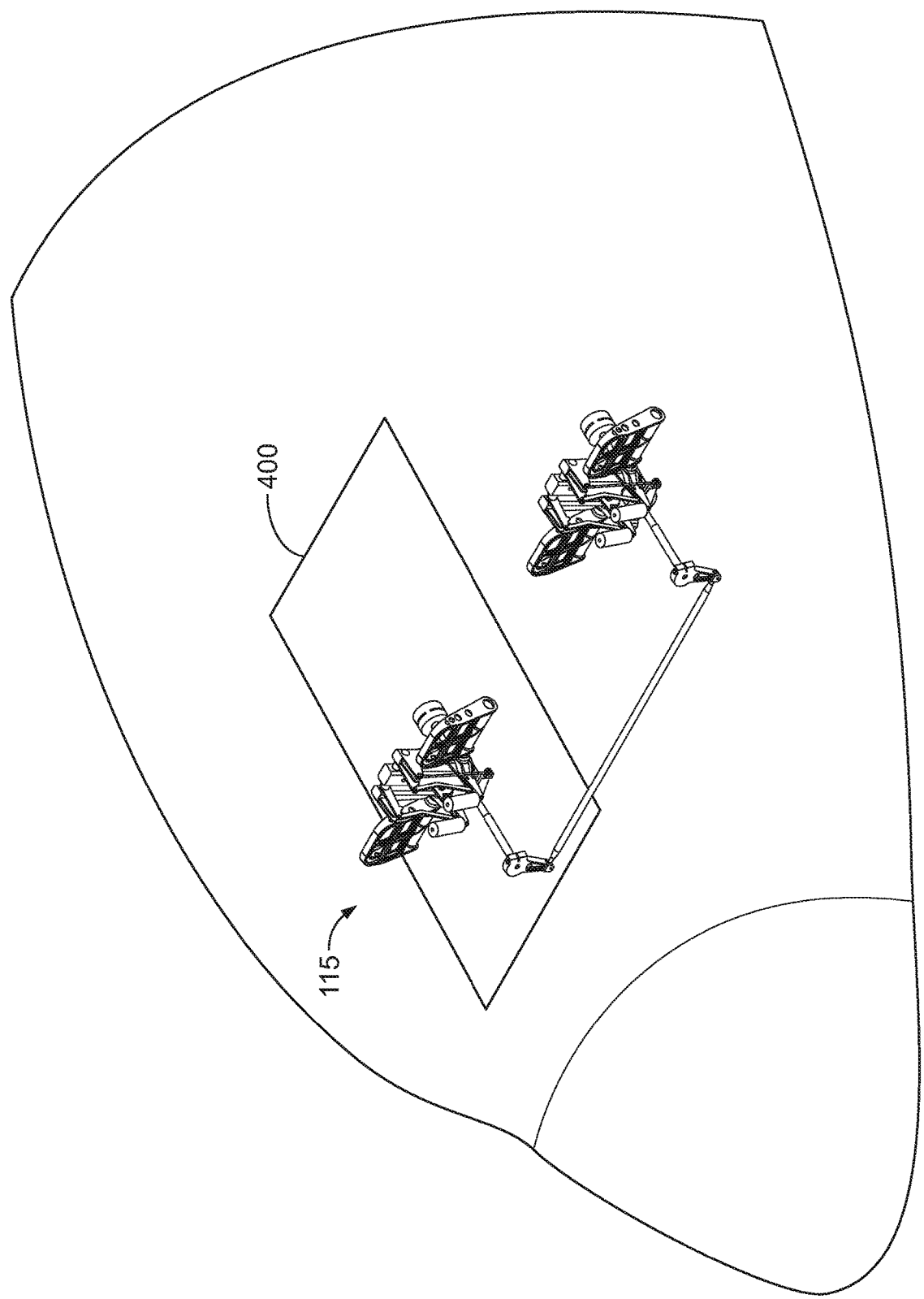
FIG. 5A is a front perspective view of the example first and second sets of rudder pedals and associated flight control components of FIG. 4A.
Figure 5B:
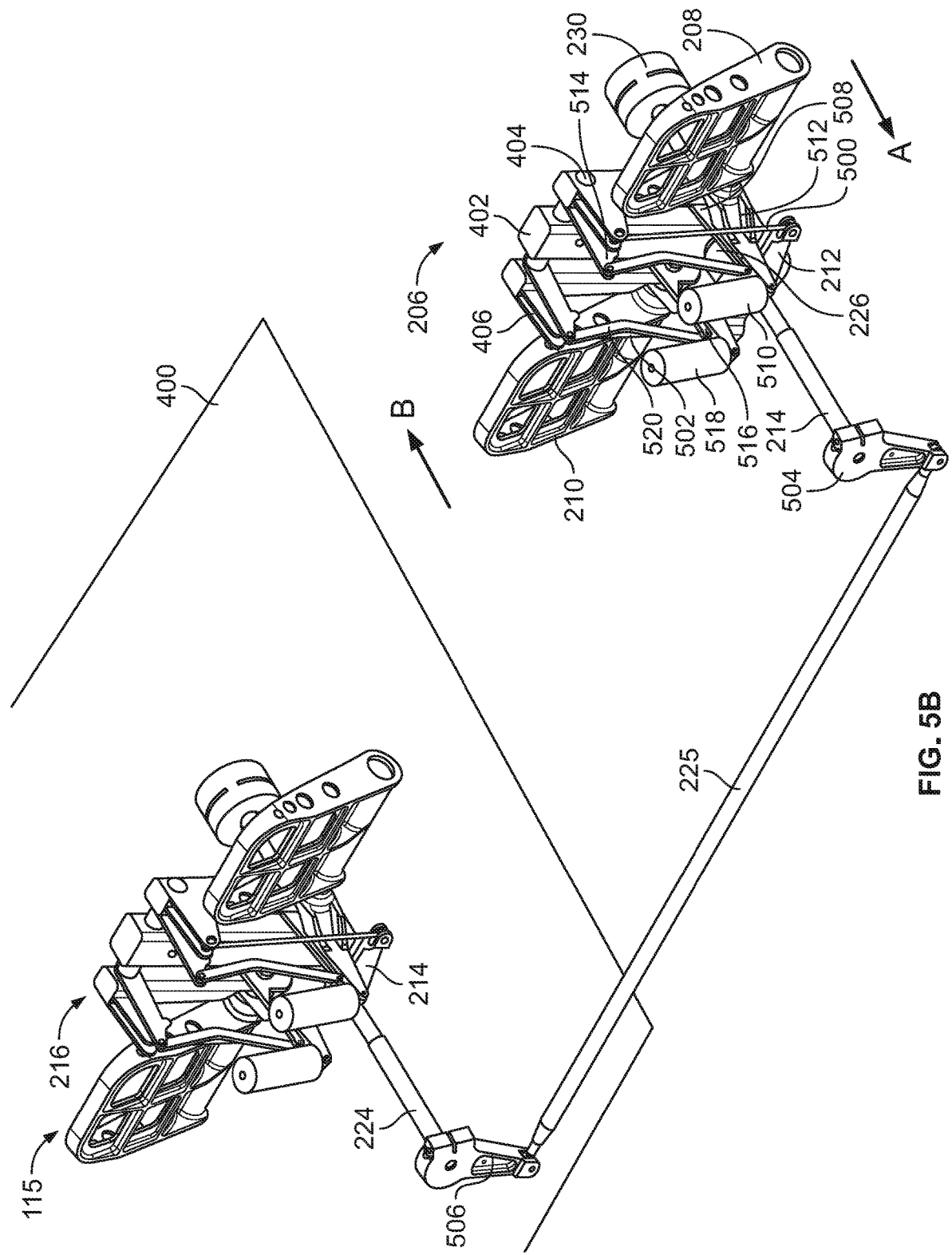
FIG. 5B is an enlarged view of the example first and second sets of rudder pedals and associated flight control components from FIG. 5A.

FIGS. 4A and 5A are perspective views of an example implementation of the first and second sets of rudder pedals 206, 216 and the associated flight control components in the cockpit 115. FIGS. 4B and 5B are enlarged views of the example implementations from FIGS. 4A and 5A, respectively. Only a portion of a flight deck floor 400 is shown in FIGS. 4A-5B for clarity. As shown in FIGS. 4B and 5B, the first and second sets of rudder pedals 206, 216 and associated rudder control components are disposed above the flight deck floor 400 in the cockpit 115. In other examples, one or more the associated flight control components may be disposed below the flight deck floor 400.

In the illustrated example, the first left and right pedals 208, 210 of the first set of rudder pedals 206 are moveably coupled to a first post 402 (which may be referred to as a carriage) extending upward from the flight deck floor 400. In some examples, the first post 402 is adjustable (e.g., via a hand crank, an electric motor, a latch, etc.) toward or away from the pilot for convenient and comfortable use by the entire pilot population. A left pedal arm 404 and a right pedal arm 406 are pivotally coupled to opposite sides of the upper end of the first post 402. Also, the first left pedal 208 is coupled to the left pedal arm 404, and the first right pedal 210 is coupled to the right pedal arm 406.

FIG. 6 is a front view of the first set of rudder pedals 206. As shown in FIGS. 5B and 6, a first push rod 500 is coupled between the left pedal arm 404 and the first bell crank 212, and a second push rod 502 is coupled between the right pedal arm 406 and the first bell crank 212. The first bell crank 212 is coupled to and rotates the first shaft 214 (FIGS. 4B and 5B). When the first left pedal 208 is pushed forward (in the direction of A in FIGS. 4B and 5B), for example, the left pedal arm 404 pulls the first push rod 500 upward, which rotates the first bell crank 212 (in the counter-clockwise direction in FIG. 6). As a result, the first bell crank 212 pulls the second push rod 502 downward, which rotates the right pedal arm 406 to move the first right pedal 210 rearward (in the direction of B in FIGS. 4B and 5B). The opposite effect occurs when the first right pedal 210 is pushed forward (i.e., the first left pedal 208 is moved rearward).

As shown in FIGS. 4B and 5B, the first position sensor 230 is coupled to the first shaft 214 (e.g., to an end of the first shaft 214) and, thus, rotates with the first shaft 214 as the first set of rudder pedals 206 are moved. The rotational position of the first position sensor 230 corresponds to the position of the first set of rudder pedals 206. In other examples, the first position sensor 230 may measure a position of one of the rudder pedals 208, 210 directly and/or another flight component associated with the first set of rudder pedals 206. As shown in the illustrated example of FIG. 4B, the first force sensor 244 is coupled to the front of the first left pedal 208 and the second force sensor 246 is coupled to the front of the first right pedal 210. The first and second force sensors 244, 246 detect or measure force applied to the respective first left and right pedals 208, 210 by the pilot. In this example, the first and second force sensors 244, 246 are coupled to the respective first left and right pedals 208, 210 near the bottoms of the first left and right pedals 208, 210. In other examples, the first and second force sensors 244, 246 may be coupled to other locations on the respective first left and right pedals 208, 210. In still other examples, such as disclosed in further detail in connection with FIG. 10, the first and second force sensors 244, 246 can be coupled one or more of the flight control components associated with the first left and right pedals 208, 210.

Referring to FIG. 5B, the first shaft 214 is also coupled to a first crank 504, which is coupled to an end of the push rod 225. When the first shaft 214 is rotated (via movement of the first set of rudder pedals 206), the first crank 504 moves the push rod 225 in a generally linear direction. In this example, the second set of rudder pedals 216 is substantially the same as the first set of rudder pedals 206 and includes substantially the same associated flight control components. The second shaft 224 (which is rotated by movement of the push rod 225 and/or movement of the second set of rudder pedals 216) is coupled to a second crank 506, which is coupled to an opposite end of the push rod 225. Therefore, rotation of one of the first or second shafts 214, 224 moves the push rod 225 generally linearly, which causes rotation in the other one of the first or second shafts 214, 224. Thus, the first and second sets of rudder pedals 206, 216 move in unison. As shown in FIG. 5B, the feel and centering mechanism 226 is operatively coupled to the first shaft 214. In other examples, the feel and centering mechanism 226 may be operatively coupled to the second shaft 224 and/or another flight control component.

In some examples, the first left pedal 208 and/or the first right pedal 210 may be pivoted about their respective bases to provide a braking function. For example, as shown in FIG. 5B, a first spring support arm 508 is coupled to the left pedal arm 404 (e.g., on the opposite side of the left pedal arm 404 as the first left pedal 208). The first spring support arm 508 swings with the first left pedal 208 on the left pedal arm 404 as the first left pedal 208 is moved toward or away from the neutral position. A first spring 510 is coupled to an end of the first spring support arm 508. The first spring 510 may be implemented as a physical spring (e.g., a coil spring) or an air spring. One or more brake sensors may be integrated with the first spring 510 to detect movement of a stem (the stem 900 in FIG. 9), which corresponds to pivoting movement of the first left pedal 208. A lever arm 512 that extends from the first left pedal 208 is coupled to a stem extending from the first spring 510. A first linkage 514 couples the first spring support arm 508 and the first post 402 (e.g., a location that is coaxial with the left pedal arm 404) to prevent the first spring support arm 508 from pivoting relative to the first left pedal 208. An example of this operation is described in further detail in connection with FIG. 9. Similarly, with respect to the first right pedal 210, a second spring support arm 516 is coupled to the right pedal arm 406, a second spring 518 is coupled to an end of the second spring support arm 516, and a second linkage 520 couples the second spring support arm 516 to the right pedal arm 406.

Figure 7:
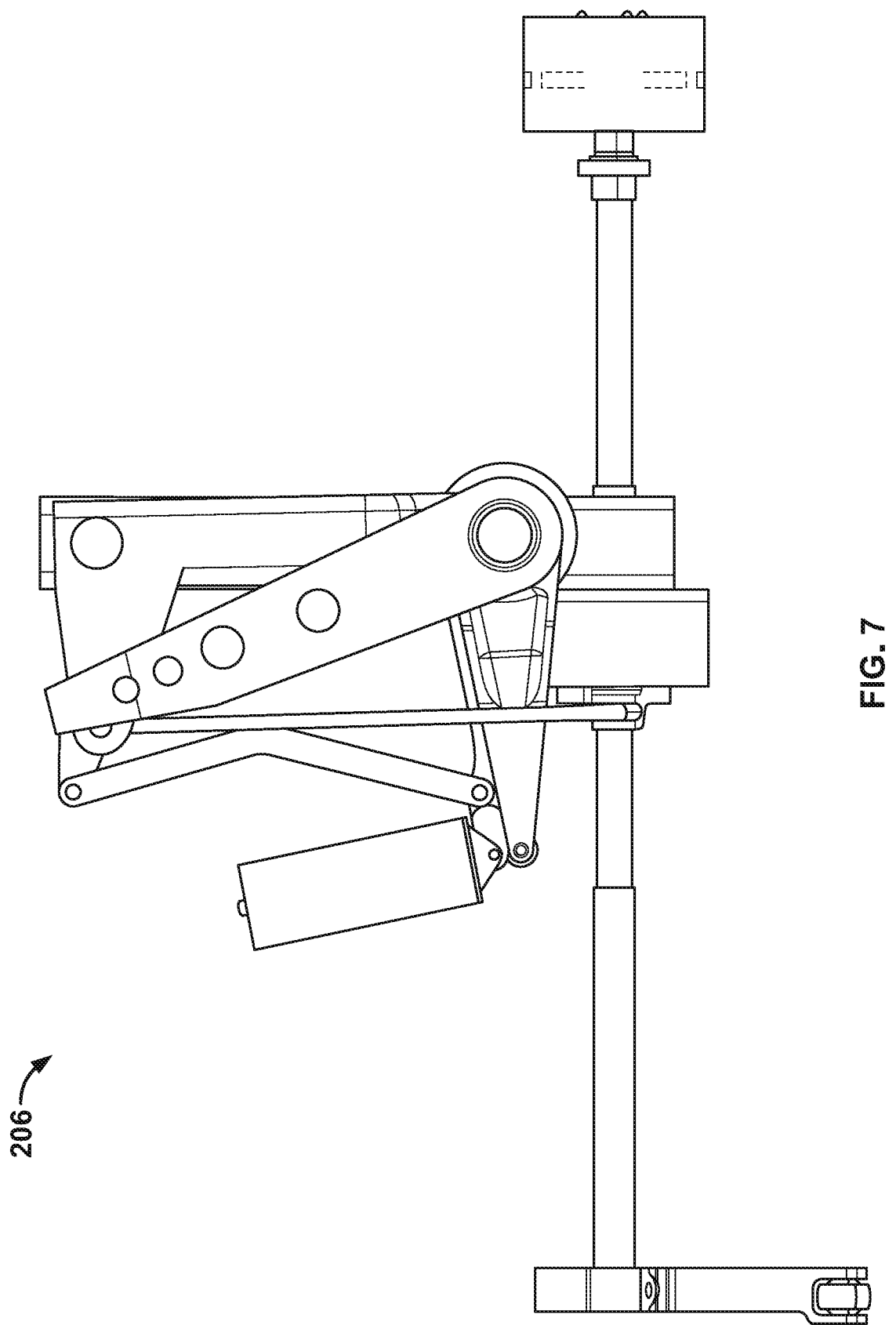
FIG. 7 is a left side view of the first set of rudder pedals of FIGS. 4A and 4B in a neutral position.
Figure 8:
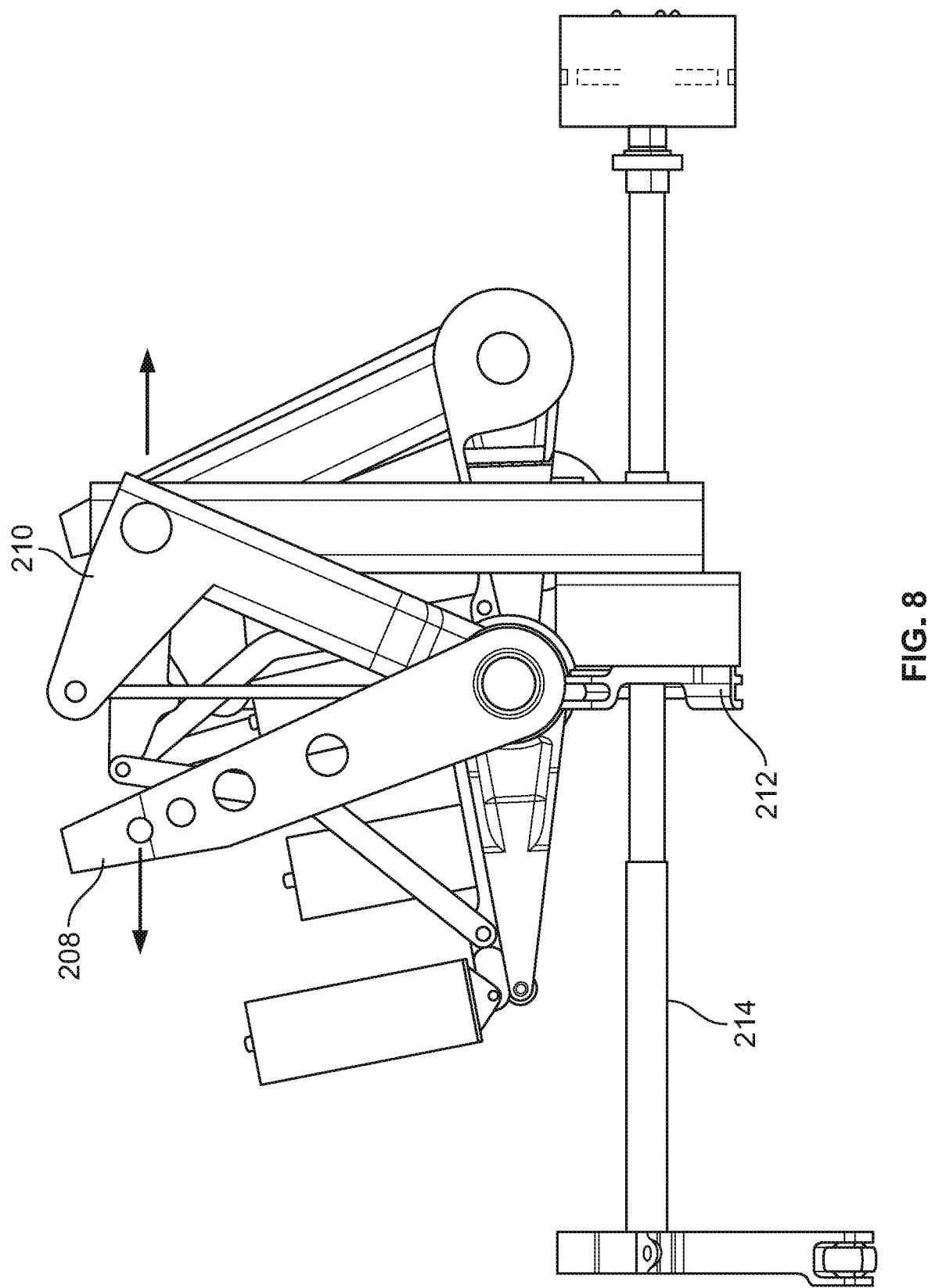
FIG. 8 is a left side view of the first set of rudder pedals of FIG. 7 with a left rudder pedal input.

FIG. 7 is a side view of the first set of rudder pedals 206 in the neutral position. FIG. 8 shows the first left pedal 208 being pushed forward (to the left in FIG. 8, in a direction away from the pilot), which moves the first right pedal 210 rearward (to the right in FIG. 8, in a direction toward the pilot). In particular, movement of the first left pedal 208 causes rotation of the first bell crank 212, which moves the first right pedal 210 in the opposite direction of the first left pedal 208. Likewise, movement of the first right pedal 210 causes movement of the first left pedal 208 in the opposite direction. Further, rotation of the first bell crank 212 causes rotation of the first shaft 214, which is transferred to the second shaft 224 (FIG. 5B), which rotates the second bell crank 222 (FIG. 5B), thereby moving the second left and right pedals 218, 220 (FIG. 5B) in the same directions.

Figure 9:
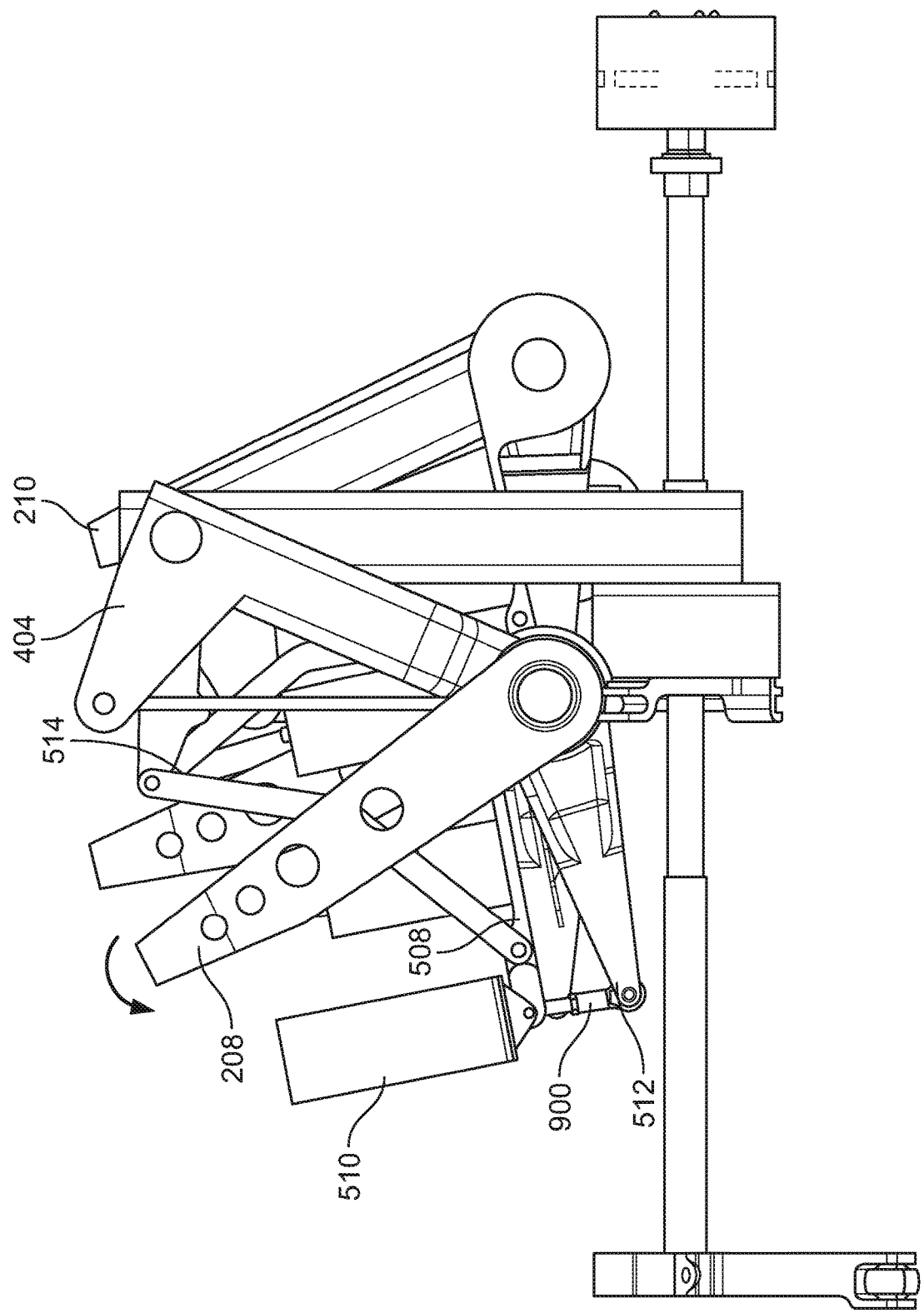
FIG. 9 is a left side view of the first set of rudder pedals of FIG. 8 with the left rudder pedal pivoted forward to apply a brake input.

If the pilot desires to perform a braking function, the pilot may pivot (e.g., by applying pressure via his/her toes) the first left pedal 208 and/or the first right pedal 210 forward. For example, as shown in FIG. 9, the first left pedal 208 has been pivoted forward (in the counter-clockwise direction in FIG. 9) about the connection between the first left pedal 208 and the left pedal arm 404. When the first left pedal 208 is pivoted forward, the lever arm 512 pulls a stem 900 from the first spring 510, thereby compressing (or, in other examples, expanding) the first spring 510. The position of the stem 900 is detected by a sensor and used to control one or more wheel brakes on the landing gear on the aircraft 100. The first linkage 514 prevents the first spring support arm 508 (and, thus, the first spring 510) from pivoting with the first left pedal 208. The first spring 510 provides a biasing or return force on the lever arm 512, so that when the pilot releases brake pressure on the first left pedal 208, the first left pedal 208 pivots back (to the right in FIG. 9) to a neutral position. The first right pedal 210 operates in substantially the same manner. The first left and right pedals 208, 210 can pivot independent of each other to apply brakes to the left and right sides of the aircraft, respectively.

Figure 10:
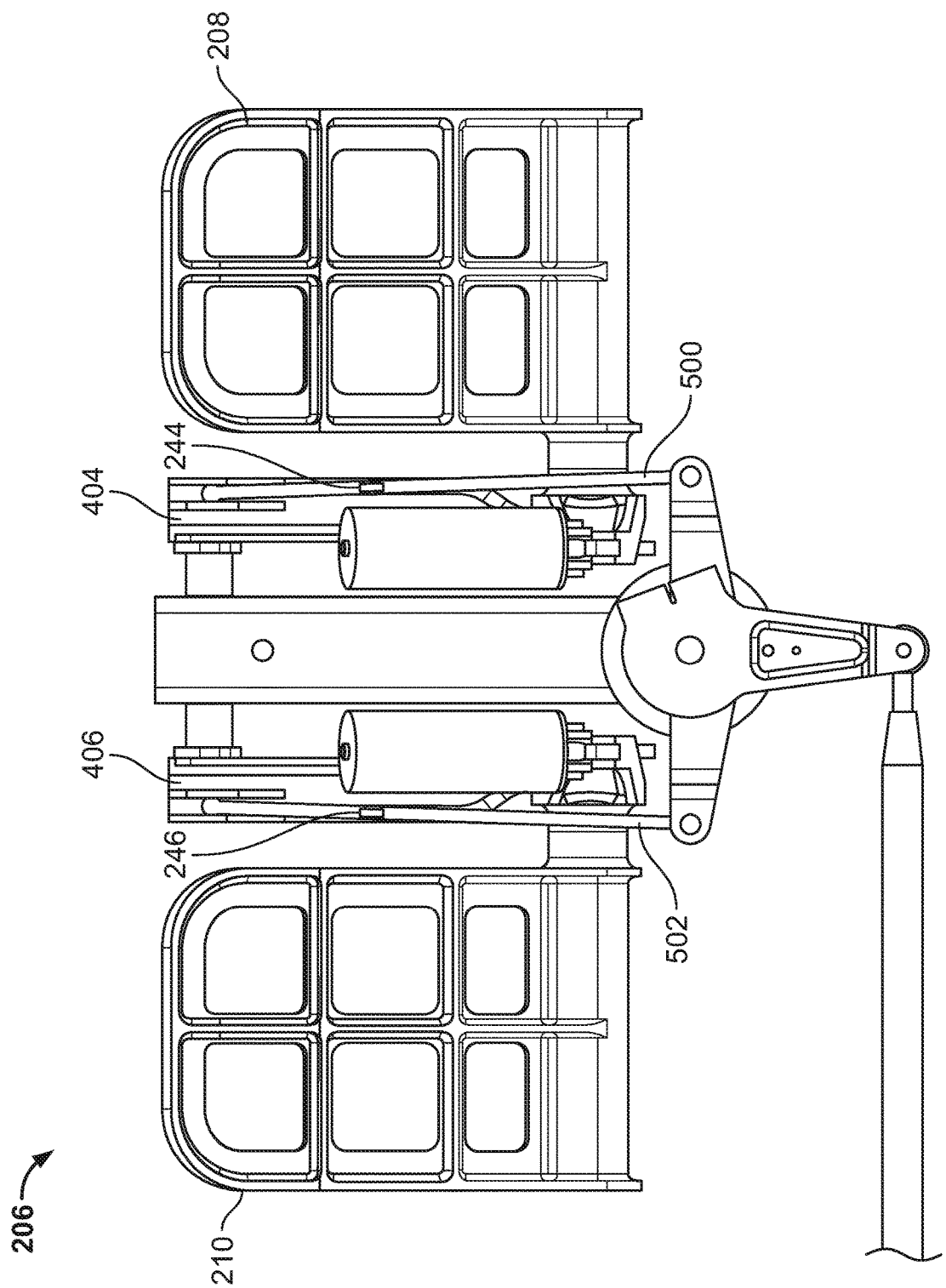
FIG. 10 is a front view of the first set of rudder pedals and associated flight control components of FIGS. 4A and 4B showing an example in which force sensors are coupled to the associated flight control components.

As disclosed herein, in some examples, the first and second force sensors 244, 246 can be coupled to one or more of the flight control components rather than directly to the front of the first left and right pedals 208, 210. For instance, FIG. 10 illustrates an example where the first force sensor 244 is coupled to or integrated with the first push rod 500 and the second force sensor 246 is coupled to or integrated with the second push rod 502. The first and second force sensors 244, 246 can be implemented as strain sensors that measure or detect the strain in the respective first and second push rods 500, 502. The strain in the first and second push rods 500, 502 can be correlated to the force applied to the first left and right pedals 208, 210. In other examples, the first and/or second force sensors 244, 246 can be coupled to or otherwise integrated with other ones of the flight control components in a manner that enables them to measure or detect force applied to the first set of rudder pedals 206.

Figure 11:
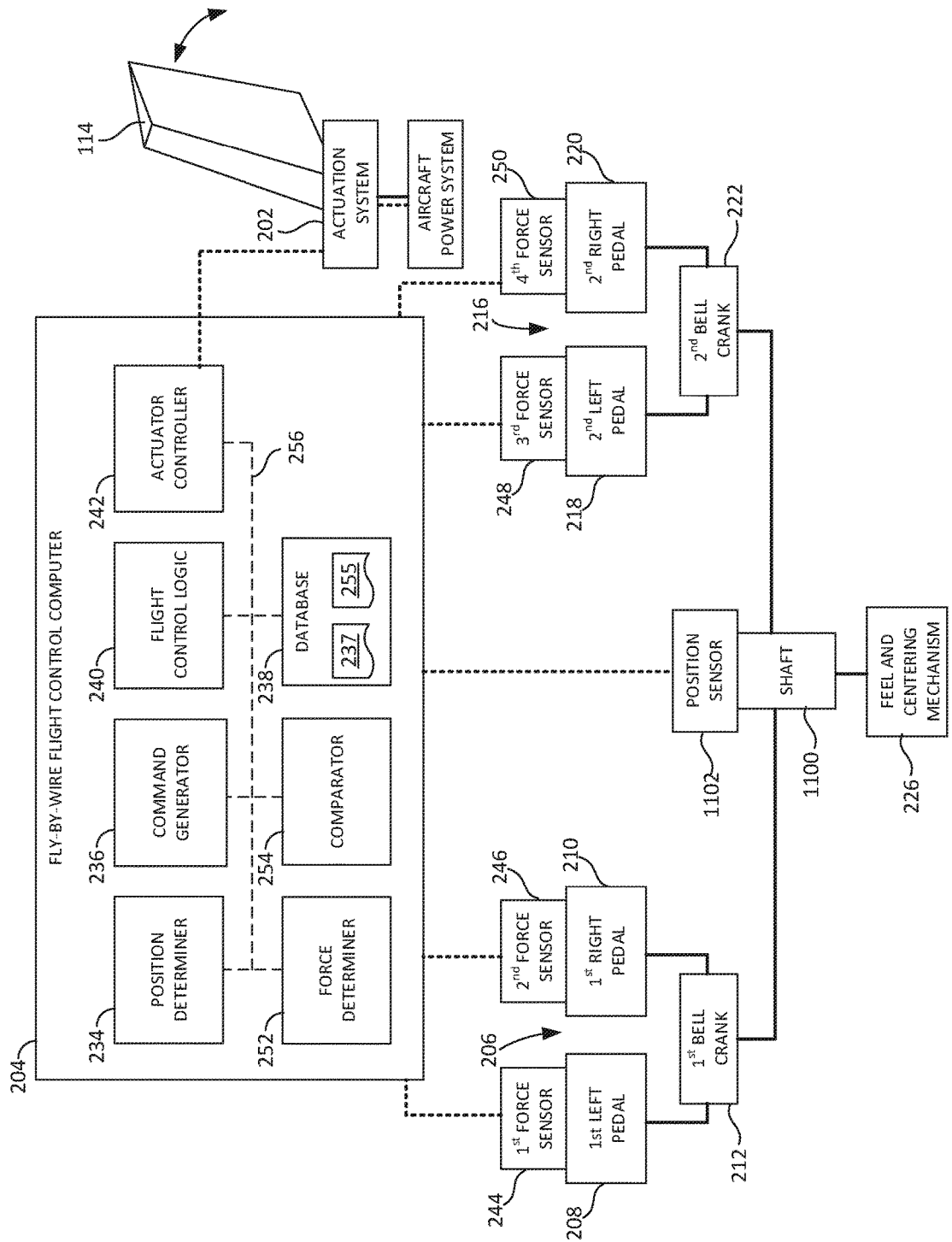
FIG. 11 is a schematic illustration of the example FBW flight control computer of FIG. 2 implemented in connection with a rudder pedal architecture having a single rigid shaft.

The physical implementation disclosed in connection with FIGS. 2 and 4A-10 illustrates the disclosed systems and methods in connection with a mechanical layout or architecture having the first and second shafts 214, 224. The example systems and methods can similarly be implemented in connection with other types of layouts or architectures. For example, FIG. 11 is a schematic illustration of the example FBW flight control computer 204 and associated components of FIG. 2 implemented in connection with a rudder pedal architecture having a single rigid shaft. The components in FIG. 11 that are the same as in FIG. 2 have been numbered for clarity. The FBW flight control computer 204 operates in substantially the same manner as disclosed herein to provide jam detection and jam mitigation. In this example, the first bell crank 212 and the second bell crank 222 are coupled by a single, rigid shaft 1100, rather than two separate shafts with separate positions sensors. In this example, a position sensor 1102 measures a position (rotational angle) of the shaft 1100, which corresponds to the position of the first and second sets of rudder pedals 206, 216. Signals from the positions sensor 1102 are transmitted to the FBW flight control computer 204. The single shaft architecture illustrated in FIG. 11 is not commonly used because it does not allow the incorporation of known jam mitigation mechanisms like a force limiting rod or spring-loaded force limiter. In particular, because the position sensor 1102 is on the shaft 1100, decoupling of the first and second sets of rudder pedals 206, 216 would cause the position sensor to also be decoupled from at least one set of pedals, thus defeating the purpose of maintaining control from one set of pedals in the event of a jam. The example systems and methods disclosed herein can be used to mitigate jams in this type of architecture, thereby enabling this type of architecture to be utilized on aircraft requiring jam mitigation capability. Therefore, a regulatory requirement for jam mitigation does not preclude the use of this type of simpler single-shaft designs. These types of designs are less complex and utilize less parts (e.g., shafts, sensors, etc.) than other known architectures, which results in reduced costs and weight.

While an example manner of implementing the FBW flight control computer 204 is illustrated in FIG. 2, one or more of the elements, processes and/or devices illustrated in FIG. 2 may be combined, divided, re-arranged, omitted, eliminated and/or implemented in any other way. Further, the example position determiner 234, the example command generator 236, the example flight control logic 240, the example actuator controller 242, the example force determiner 252, the example comparator 254, and/or, more generally, the example FBW flight control computer 204 of FIG. 2 may be implemented by hardware, software, firmware and/or any combination of hardware, software and/or firmware. Thus, for example, any of the example position determiner 234, the example command generator 236, the example flight control logic 240, the example actuator controller 242, the example force determiner 252, the example comparator 254, and/or, more generally, the example FBW flight control computer 204 could be implemented by one or more logic circuits including, for example, one or more analog or digital circuit(s), programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example position determiner 234, the example command generator 236, the example flight control logic 240, the example actuator controller 242, the example force determiner 252, and/or the example comparator 254 is/are hereby expressly defined to include a non-transitory computer readable storage device or storage disk such as a memory, a digital versatile disk (DVD), a compact disk (CD), a Blu-ray disk, etc. including the software and/or firmware. Further still, the example FBW flight control computer 204 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 12:
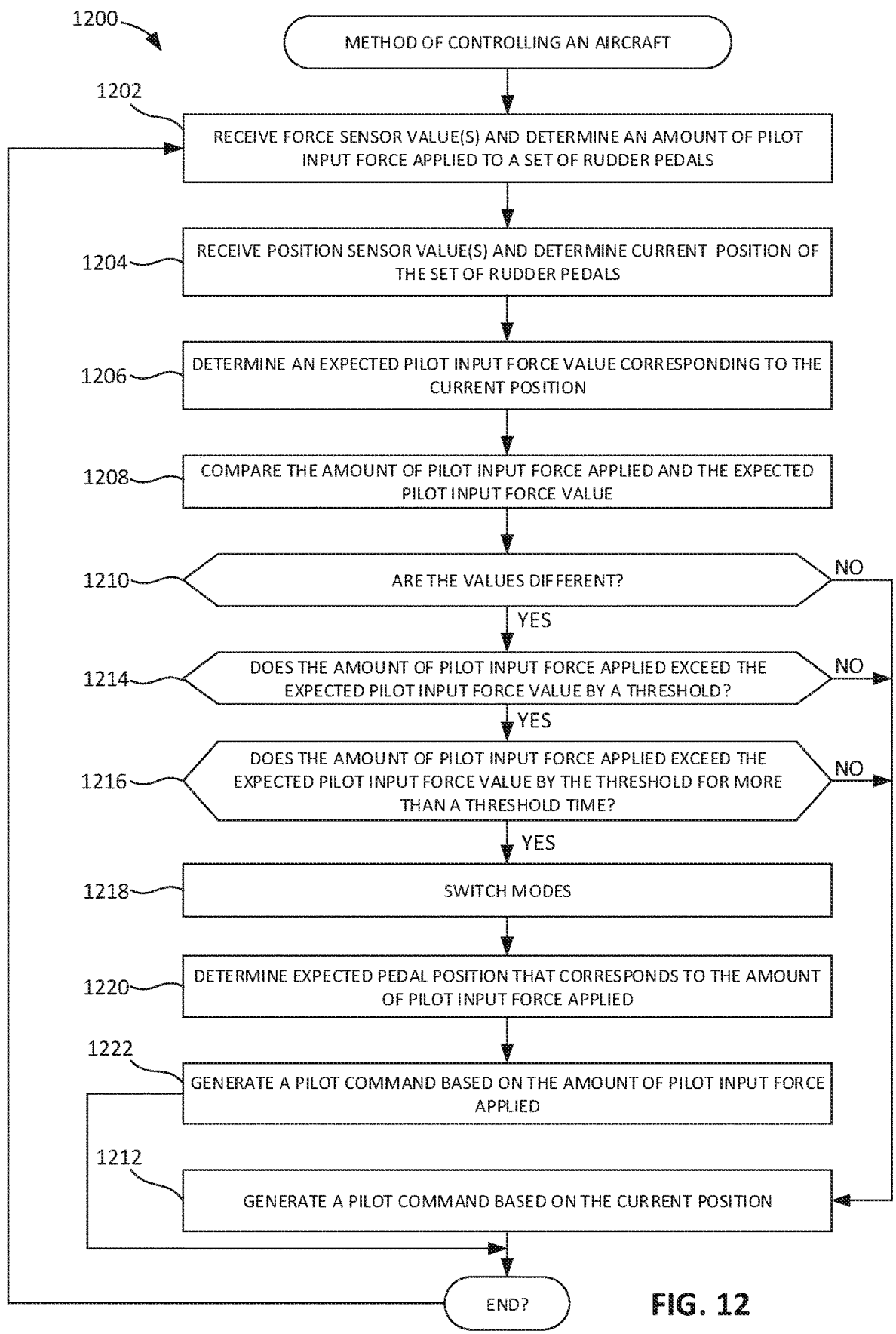
FIG. 12 is a flowchart representative of machine readable instructions that may be executed to implement the example FBW flight control computer of FIG. 2 to control the aircraft of FIG. 1.

A flowchart representative of example hardware logic, machine readable instructions, hardware implemented state machines, and/or any combination thereof for implementing the FBW flight control computer 204 of FIG. 2 is shown in FIG. 12. The machine readable instructions may be an executable program or portion of an executable program for execution by a computer processor such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowchart illustrated in FIG. 12, many other methods of implementing the example FBW flight control computer 204 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), etc.) structured to perform the corresponding operation without executing software or firmware.

As mentioned above, the example processes of FIG. 12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 12 is a flowchart representative of machine readable instructions 1200 that may be executed by the FBW flight control computer 204 of FIG. 2 to control an aircraft. The example process of FIG. 12 is described in connection with the first set of rudder pedals 206. However, it is to be understood that the example process may be similarly performed in connection with the second set of rudder pedals 216. Further, while in this example the flight control component is the first set of rudder pedals 206 and the flight control surface is the rudder 114, in other examples, the process may be performed with another flight control component (e.g., a side stick, a control column, a control wheel, etc.) and/or another flight control surface (e.g., one or more elevators, one or more ailerons, etc.).

At block 1202, the force determiner 252 receives one or more force sensor value(s) from the first and/or second force sensors 244, 246 and determines the amount of pilot input force applied to the first set of rudder pedals 206 based on the force sensor value(s). In some examples, the amount of pilot input force is calculated as a net force applied to the first set of rudder pedals 206. For example, force applied to the first left pedal 208 (as detected by the first force sensor 244) may be considered a positive force and force applied to the first right pedal 210 (as detected by the second force sensor 246) may be considered a negative force.

At block 1204, the position determiner 234 receives one or more position sensor value(s) (e.g., signals) from the first position sensor 230 and determines the current position of the first set of rudder pedals 206 based on the position sensor value(s). In some examples, movement of the first left pedal 208 away from the pilot (which moves the first right pedal 210 toward the pilot) is considered a positive position value and movement of the first right pedal 210 away from the pilot (which moves the first left pedal 208 toward the pilot) is considered a negative position value.

At block 1206, the comparator 254 determines the expected pilot input force value corresponding to the current position of the first set of rudder pedals 206 (determined at block 1204). In some examples, the comparator 254 uses a look-up table, such as the look-up table 255, which is stored in the database 238. The look-up table 255 includes corresponding values of expected pilot input force values and positions of the first set of rudder pedals 206. At block 1208, the comparator 254 compares the determined amount of pilot input force applied (determined at block 1202) and the expected pilot input force value (determined at block 1206).

At block 1210, the comparator 254 determines whether the amount of pilot input force applied and the expected pilot input force value are different. If the values are not different (i.e., they are the same), it is indicative that no jam has occurred. As a result, control proceeds to block 1212 and the command generator 236 generates a pilot command based on the current pedal position. The pilot command may be provided to the flight control logic 240, which may modify the pilot command. The flight control logic 240 sends a final command to the actuator controller 242 to activate the actuation system 202 to move the rudder 114 to the position/deflection of the final command. In other examples, the pilot command may be communicated directly to the actuator controller 242 to control the movement of the rudder 114. The example process of FIG. 12 may be repeated. In some examples, the process of FIG. 12 is repeated at a fixed frequency (e.g., every millisecond, every 50 milliseconds, every second, every 30 seconds, every minute, etc.). In other examples, such as where the aircraft 100 has landed and is no longer in flight, the example process may end.

If the values at block 1210 are not the same, the comparator 254, at block 1214, determines whether the amount of pilot input force applied exceeds the expected pilot input force value by a threshold. In some examples, the threshold is a percentage of the expected pilot input force value, such as at least 5% of the expected pilot input force value. In other examples, other threshold percentages may be used. For example, the threshold may be at least 2% of the expected pilot input force value. In other examples, the threshold may be any threshold within a range, such as between 5% and 10% of the expected pilot input force value. In other examples, other ranges may be used, such as between 2% and 7% of the expected pilot input force value or between 3% and 5% of the expected pilot input force value. In other examples, the threshold may be a predetermined force value, such as 5 lbs. In other examples, other predetermined force values may be used. In some examples, a threshold force value may be determined based on the expected pilot input force value.

If the amount of pilot input force applied does not exceed the expected pilot input force value by the threshold, control proceeds to block 1212 and the command generator 236 continues to generate pilot commands based on the current pedal position. As disclosed above, the example process may then be repeated.

Otherwise, if the amount of pilot input force applied does exceed the expected pilot input force value by the threshold, the comparator 254, at block 1216, determines whether the amount of pilot input force applied exceeds the expected pilot input force value by the threshold for more than a threshold time. The threshold time may be any desired time length, such as, for example, 1 second, 5 seconds, etc. In some examples, this check ensures an actual jam has occurred by distinguishing an increase in force from a random, accidental spike in force (e.g., if a pilot unintentionally kicks the first set of rudder pedals 206 with a high force). In other examples, this time check at block 1216 may not be implemented.

If the amount pilot input force applied does not exceed the expected pilot input force value by the threshold for the threshold time, control proceeds to block 1212 and the command generator 236 continues to generate pilot commands based on the current pedal position. As disclosed above, the example process may then be repeated. If the amount pilot input force applied does exceed the expected pilot input force by the threshold (and, in some examples, for more than the threshold time), it is indicative that the first set of rudder pedals 206 are jammed. In such an instance, at block 1218, the command generator 236 switches modes from a first mode in which the command generator 236 generates a pilot command based on the current position of the first set of rudder pedals 206 to a second mode in which the command generator 236 generates a pilot command based on the amount of pilot input force applied to the first set of rudder pedals 206 and not the current position of the first set of rudder pedals 206.

At block 1220, the command generator 236 determines the expected pedal position that corresponds to the determined amount of pilot input force applied. In some examples, the command generator 236 uses a look-up table, such as the look-up table 255, which includes a correlation of expected pedal positions and expected force values. In some examples, the command generator 236 uses the hysteresis band 302 to determine the expected pedal position. The hysteresis band 302 accounts for differences in force that would be otherwise felt during normal operation. For example, if the amount of pilot input force applied is increasing, the command generator 236 uses the upper line 304 to determine the expected pedal position, and if the amount of pilot input force applied is decreasing, the command generator 236 uses the lower line 306 to determine the expected pedal position.

At block 1222, the command generator 236 generates a pilot command based on the amount of pilot input force applied. In particular, the command generator 236 generates a pilot command based on the expected pedal position (as determined at block 1220), which is based on the amount of pilot input force applied. The command generator 236 may use a look-up table, such as the look-up table 237, that correlates pedal position and rudder position/deflection. The pilot command is output to the flight control logic 240. The flight control logic 240 may alter the pilot command. The final command, which is based on the pilot command from the command generator 236, it transmitted to the actuator controller 242. The actuator controller 242 activates the actuation system 202 to move the rudder 114 to the corresponding position of the final command. In some examples, after detecting a jam, the command generator 236 continues to generate the pilot commands based on the pilot input force for the remainder of the flight. In other examples, the process may begin again and, if it is determined the first set of rudder pedals 206 is not jammed, the command generator 236 can switch back to the first mode in which the command generator 2336 generates commands based on the current pedal position.

Figure 13:
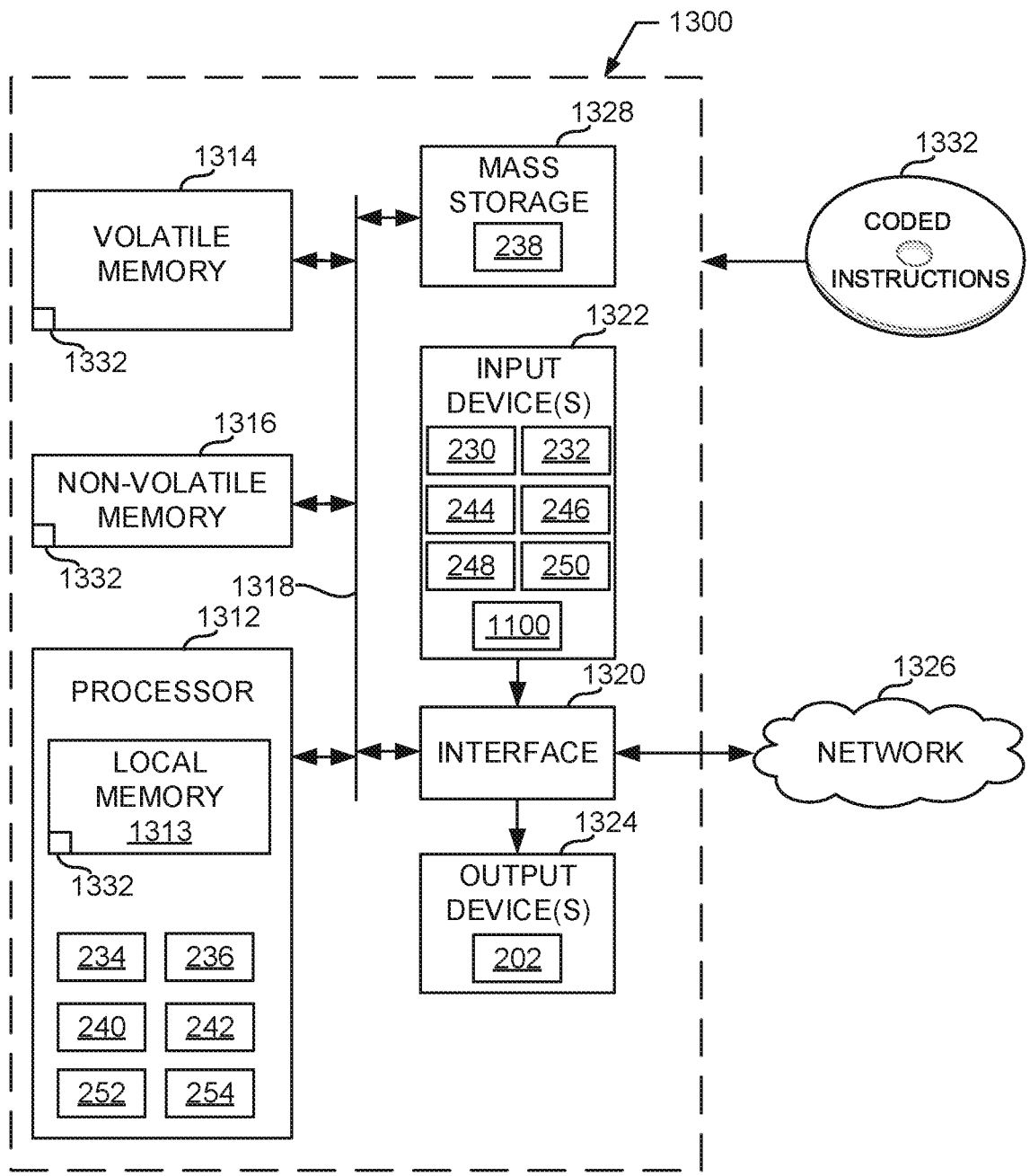
FIG. 13 is a block diagram of an example processing platform structured to execute the example machine readable instructions of FIG. 12 to implement the example FBW flight control computer of FIG. 2.

FIG. 13 is a block diagram of an example processor platform 1300 structured to execute the instructions of FIG. 12 to implement the FBW flight control computer 204 of FIG. 2. The processor platform 1300 can be, for example, flight control electronics, a server, a personal computer, a workstation, a self-learning machine (e.g., a neural network), a mobile device (e.g., a cell phone, a smart phone, a tablet such as an iPad™), or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1312 implements the example position determiner 234, the example command generator 236, the example flight control logic 240, the example actuator controller 242, the example force determiner 252, and the example comparator 254.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user and/or device to enter data and/or commands into the processor 1312. The input device(s) 1322 may include, for example, the first position sensor 230, the second position sensor 232, the position sensor 1102 (FIG. 11), the first force sensor 244, the second force sensor 246, the third force sensor 248, and/or the fourth force sensor 250. Additionally or alternatively, the input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output device(s) 524 may include, for example, the actuation system 202 (e.g., one or more actuators). Additionally or alternatively, the output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. Therefore, in some examples, the interface circuit 1320 of the illustrated example includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives. In this example, the mass storage devices 1328 may include the database 238.

The machine executable instructions 1332 of FIG. 12 may be stored in the mass storage device 1328, in the volatile memory 1314, in the non-volatile memory 1316, and/or on a removable non-transitory computer readable storage medium such as a CD or DVD.

From the foregoing, it will be appreciated that example methods, apparatus, systems, and articles of manufacture have been disclosed that mitigate jams in a pilot cockpit controller of a FBW system. Examples disclosed herein enable to pilot to control a corresponding flight control surface, even when the flight control component is unmovable and, thus, enables a pilot to continue to control the aircraft. The examples disclosed herein enable either pilot of a two-pilot aircraft to continue flying following a jam, whereas in known systems only the pilot on the non-jammed side can fly following a decoupling operation. The examples disclosed herein also enable continued control of a flight control surface without having to decouple a pilot cockpit controller from another pilot cockpit controller, as required in other systems. Further, the examples disclosed herein enable the use of architectures for which a decoupling mechanism cannot satisfy the regulations (e.g., because all of the position sensors are on one shaft). Therefore, examples disclosed herein enhance safety of an aircraft.

Different aspects of the examples disclosed herein can be combined in other examples. Further examples and combinations thereof include the following.

Example 1 includes a method of controlling an aircraft with a fly-by-wire system. The method includes determining a current position of a pilot cockpit controller of the fly-by-wire system, determining an amount of pilot input force applied to the pilot cockpit controller, determining an expected pilot input force value that corresponds to the current position of the pilot cockpit controller, and, if the amount of pilot input force applied exceeds the expected pilot input force value by a threshold, generating a pilot command based on the amount of pilot input force applied and not the current position of the pilot cockpit controller.

Example 2 includes the method of Example 1, wherein determining the amount of pilot input force applied to the pilot cockpit controller is based on a signal from a force sensor coupled to the pilot cockpit controller.

Example 3 includes the method of Examples 1 or 2, wherein determining the current position of the pilot cockpit controller is based on a signal from a position sensor associated with the pilot cockpit controller.

Example 4 includes the method of any of Examples 1-3, wherein generating the pilot command includes determining an expected position of the pilot cockpit controller based on the amount of pilot input force applied, determining the pilot command corresponding to the expected position of the pilot cockpit controller, and outputting the pilot command to a flight control logic.

Example 5 includes the method of Example 4, wherein determining of the expected position of the pilot cockpit controller includes using a hysteresis band.

Example 6 includes the method of any of Examples 1-5, wherein the threshold is at least 5 percent of the expected pilot input force value.

Example 7 includes the method of any of Examples 1-6, wherein the threshold is between 5 percent and 10 percent of the expected pilot input force value.

Example 8 includes the method of any of Examples 1-7, wherein the flight control component is a set of rudder pedals.

Example 9 includes the method of Example 8, wherein the pilot command indicates a desired position or deflection of a rudder of the aircraft.

Example 10 includes a fly-by-wire system for an aircraft, the fly-by-wire system including a pilot cockpit controller, a position sensor to detect a position of the pilot cockpit controller, a force sensor to detect an amount of pilot input force applied to the pilot cockpit controller, and a flight control computer. The flight control computer is to determine an expected pilot input force value corresponding to the position of the pilot cockpit controller detected by the position sensor, determine whether a difference between the amount of pilot input force applied detected by the force sensor and the expected pilot input force value satisfies a threshold, and, if the difference satisfies the threshold, generate a pilot command based on the amount of pilot input force applied.

Example 11 includes the fly-by-wire system of Example 10, wherein the pilot cockpit controller is a set of rudder pedals.

Example 12 includes the fly-by-wire system of Example 11, wherein the set of rudder pedals are rudder pedals for a pilot or rudder pedals for a co-pilot.

Example 13 includes the fly-by-wire system of any of Examples 10-12, wherein the pilot command is associated with a position of a rudder of the aircraft.

Example 14 includes the fly-by-wire system of any of Examples 10-13, wherein, to generate the pilot command based on the amount of pilot input force applied, the flight control computer is to determine an expected position of the pilot cockpit controller based on the amount of pilot input force applied, determine the pilot command corresponding to the expected position of the pilot cockpit controller, and output the pilot command to a flight control logic.

Example 15 includes the fly-by-wire system of any of Examples 10-14, wherein the threshold is at least 5 percent of the expected pilot input force value.

Example 16 includes a flight control computer including a logic circuit to at least determine pilot input force applied to a pilot cockpit controller of a fly-by-wire system of an aircraft, determine an expected pilot input force value that corresponds to a current position of the pilot cockpit controller, determine the pilot input force applied exceeds the expected pilot input force value by a threshold, and, in response to determining the pilot input force applied exceeds the expected pilot input force value by the threshold, determine a pilot command based on the pilot input force applied.

Example 17 includes the flight control computer of Example 16, wherein the logic circuit is to determine the pilot command by determining an expected position of the pilot cockpit controller based on the determined pilot input force applied, and determining the pilot command corresponding to the expected position of the pilot cockpit controller.

Example 18 includes the flight control computer of Example 17, wherein the logic circuit is to determine the expected position of the pilot cockpit controller using a hysteresis band of pilot input force values and corresponding positions of the pilot cockpit controller.

Example 19 includes the flight control computer of any of Examples 16-18, wherein the pilot cockpit controller is a set of rudder pedals.

Example 20 includes the flight control computer of any of Examples 16-19, wherein the threshold is at least 5 percent of the expected pilot input force value.

Although certain example methods, apparatus, systems, and articles of manufacture have been disclosed herein, the scope of coverage of this patent is not limited thereto. On the contrary, this patent covers all methods, apparatus, systems, and articles of manufacture fairly falling within the scope of the claims of this patent.

What is claimed is:

1. A method of controlling an aircraft with a fly-by-wire system, the method comprising:
   determining a current position of a pilot cockpit controller of the fly-by-wire system;
   determining an amount of pilot input force applied to the pilot cockpit controller;
   determining, using a first table of correlations between pilot input force values and positions of the pilot cockpit controller, an expected pilot input force value that corresponds to the current position of the pilot cockpit controller; and
   if the amount of pilot input force applied exceeds the expected pilot input force value by a threshold, generating a pilot command based on the amount of pilot input force applied and not the current position of the pilot cockpit controller, wherein generating the pilot command includes:
      determining, using the first table of correlations, an expected position of the pilot cockpit controller based on the amount of pilot input force applied;
      determining, using a second table of correlations between the positions of the pilot cockpit controller and positions of a movable flight surface of the aircraft, the pilot command corresponding to the expected position of the pilot cockpit controller; and outputting the pilot command to a flight control logic.

2. The method of claim 1, wherein determining the amount of pilot input force applied to the pilot cockpit controller is based on a signal from a force sensor coupled to the pilot cockpit controller.

3. The method of claim 2, wherein determining the current position of the pilot cockpit controller is based on a signal from a position sensor associated with the pilot cockpit controller.

4. The method of claim 1, wherein the first table of correlations includes a hysteresis band.

5. The method of claim 1, wherein the threshold is at least 5 percent of the expected pilot input force value.

6. The method of claim 1, wherein the threshold is between 5 percent and 10 percent of the expected pilot input force value.

7. The method of claim 1, wherein the pilot cockpit controller is a set of rudder pedals.

8. The method of claim 7, wherein the pilot command indicates a desired position or deflection of a rudder of the aircraft.

9. A fly-by-wire system for an aircraft, the fly-by-wire system comprising:
   a pilot cockpit controller;
   a position sensor to detect a position of the pilot cockpit controller;
   a force sensor to detect an amount of pilot input force applied to the pilot cockpit controller; and
   a flight control computer to:
      determine, using a first database of pilot input force values and corresponding pilot cockpit controller positions, an expected pilot input force value corresponding to the position of the pilot cockpit controller detected by the position sensor;
      determine whether a difference between the amount of pilot input force applied detected by the force sensor and the expected pilot input force value satisfies a threshold; and
      if the difference satisfies the threshold, generate a pilot command based on the amount of pilot input force applied, wherein, to generate the pilot command based on the amount of pilot input force applied, the flight control computer is to:
         determine, using the first database, an expected position of the pilot cockpit controller based on the amount of pilot input force applied;
         determine, using a second database of the pilot cockpit controller positions and corresponding positions of a movable flight surface of the aircraft, the pilot command corresponding to the expected position of the pilot cockpit controller; and output the pilot command to a flight control logic.

10. The fly-by-wire system of claim 9, wherein the pilot cockpit controller is a set of rudder pedals.

11. The fly-by-wire system of claim 10, wherein the set of rudder pedals are rudder pedals for a pilot or rudder pedals for a co-pilot.

12. The fly-by-wire system of claim 9, wherein the pilot command is associated with a position of a rudder of the aircraft.

13. The fly-by-wire system of claim 9, wherein the threshold is at least 5 percent of the expected pilot input force value.

14. The fly-by-wire system of claim 9, wherein the first database of correlations includes a hysteresis band.

15. The fly-by-wire system of claim 9, wherein the threshold is between 5 percent and 10 percent of the expected pilot input force value.

16. A flight control computer including a logic circuit to at least:
   determine pilot input force applied to a pilot cockpit controller of a fly-by-wire system of an aircraft;
   determine, using a first table of correlations between pilot input force values and corresponding pilot cockpit controller positions during normal operation, an expected pilot input force value that corresponds to a current position of the pilot cockpit controller;
   determine the pilot input force applied exceeds the expected pilot input force value by a threshold; and
   in response to determining the pilot input force applied exceeds the expected pilot input force value by the threshold, determine a pilot command based on the pilot input force applied by:
      determining, using the first table of correlations, an expected position of the pilot cockpit controller based on the determined pilot input force applied; and
      determining, using a second table of correlations between the pilot cockpit controller positions and positions of a movable flight surface of the aircraft, the pilot command corresponding to the expected position of the pilot cockpit controller.

17. The flight control computer of claim 16, wherein the first table includes a hysteresis band of the pilot input force values and the corresponding positions of the pilot cockpit controller.

18. The flight control computer of claim 16, wherein the pilot cockpit controller is a set of rudder pedals.

19. The flight control computer of claim 16, wherein the threshold is at least 5 percent of the expected pilot input force value.

20. The flight control computer of claim 16, wherein the movable flight surface is a rudder of the aircraft.

* * * * *